United States Patent
Carter et al.

(10) Patent No.: US 12,236,942 B2
(45) Date of Patent: Feb. 25, 2025

(54) PREDICTION AND IDENTIFICATION TECHNIQUES USED WITH A HEARING PROSTHESIS

(71) Applicant: Cochlear Limited, Macquarie University (AU)

(72) Inventors: Paul Michael Carter, Macquarie University (AU); Adam Hersbach, Macquarie University (AU); Richard Bruce Murphy, Macquarie University (AU); Kenneth Oplinger, Macquarie University (AU)

(73) Assignee: Cochlear Limited, Macquarie University (AU)

( * ) Notice: Subject to any disclaimer, the term of this patent is extended or adjusted under 35 U.S.C. 154(b) by 362 days.

(21) Appl. No.: 17/416,450

(22) PCT Filed: Jun. 24, 2020

(86) PCT No.: PCT/IB2020/055982
§ 371 (c)(1),
(2) Date: Jun. 18, 2021

(87) PCT Pub. No.: WO2020/261148
PCT Pub. Date: Dec. 30, 2020

(65) Prior Publication Data
US 2022/0076663 A1    Mar. 10, 2022

Related U.S. Application Data

(60) Provisional application No. 62/865,536, filed on Jun. 24, 2019.

(51) Int. Cl.
*G10L 15/10* (2006.01)
*H04R 25/00* (2006.01)

(52) U.S. Cl.
CPC ............ *G10L 15/10* (2013.01); *H04R 25/505* (2013.01); *H04R 2225/43* (2013.01)

(58) Field of Classification Search
CPC ... G10L 15/10; G10L 15/26; G10L 2015/088; H04R 2225/43; H04R 25/505
(Continued)

(56) References Cited

U.S. PATENT DOCUMENTS 8,107,657 B2    1/2012    Hansen
8,589,166 B2    11/2013   Zopf
(Continued)

FOREIGN PATENT DOCUMENTS

| EP | 3367382 A1 | 8/2018 |
| KR | 1020170071585 A | 6/2017 |
| WO | 2007019307 A2 | 2/2007 |

OTHER PUBLICATIONS

Oldooz Hazrati et al., "Leveraging Automatic Speech Recognition in Cochlear Implants for Improved Speech Intelligibility Under Reverberation," 2015 IEEE International Conference on Acoustics, Speech and Signal Processing (ICASSP), Apr. 2015.
(Continued)

*Primary Examiner* — George C Monikang
(74) *Attorney, Agent, or Firm* — Pilloff Passino & Cosenza LLP; Martin J. Cosenza

(57) ABSTRACT

A method, including receiving a signal which includes speech data, processing the received signal to identify and/or predict one or more words in the speech data, and evoking a hearing percept based on the received signal, wherein the evoked hearing percept includes one or more modified words based on the identification and/or prediction of the one or more words.

26 Claims, 11 Drawing Sheets

(58) Field of Classification Search
USPC .......................................... 704/251; 381/312
See application file for complete search history.

(56) References Cited

U.S. PATENT DOCUMENTS

| | | |
|---|---|---|
| 8,745,683 B1 | 6/2014 | Maeng |
| 8,781,836 B2 | 7/2014 | Foo et al. |
| 9,162,069 B2 | 10/2015 | Hemmert |
| 9,772,681 B2 | 9/2017 | Koga |
| 9,814,879 B2 | 11/2017 | Banna et al. |
| 9,905,240 B2 | 2/2018 | Levitt |
| 9,916,842 B2 | 3/2018 | Levitt |
| 9,961,441 B2 | 5/2018 | Chen |
| 11,238,857 B2 | 2/2022 | Skobeltsyn et al. |
| 2010/0030012 A1 | 2/2010 | Meskens |
| 2012/0013721 A1 | 1/2012 | Nishio et al. |
| 2015/0119635 A1 | 4/2015 | Gustafsson et al. |
| 2016/0027437 A1* | 1/2016 | Hong .................... G10L 15/187 704/254 |
| 2018/0275956 A1 | 9/2018 | Reed et al. |
| 2020/0193972 A1* | 6/2020 | Feinauer ............... G10L 15/075 |

OTHER PUBLICATIONS

Timo Gerkmann et al., "Improved a posteriori Speech Presence Probability Estimation Based on a Likelihood Ratio with Fixed Priors," IEEE Transactions on Audio, Speech, and Language Processing, Jul. 2008, pp. 910-919, vol. 16.

International Search Report & Written Opinion for PCT/IB2020/055982, mailed Sep. 29, 2020.

Office action for China Application No. 202080007174.4, mailed Jan. 8, 2024.

* cited by examiner

PREDICTION AND IDENTIFICATION TECHNIQUES USED WITH A HEARING PROSTHESIS

CROSS-REFERENCE TO RELATED APPLICATIONS

This application claims priority to U.S. Provisional Application No. 62/865,536, entitled PREDICTION AND IDENTIFICATION TECHNIQUES USED WITH A HEARING PROSTHESIS, filed on Jun. 24, 2019, naming Paul Michael CARTER of Macquarie University, Australia as an inventor, the entire contents of that application being incorporated herein by reference in its entirety.

BACKGROUND

Hearing loss, which may be due to many different causes, is generally of two types: conductive and sensorineural. Sensorineural hearing loss is due to the absence or destruction of the hair cells in the cochlea that transduce sound signals into nerve impulses. Various hearing prostheses are commercially available to provide individuals suffering from sensorineural hearing loss with the ability to perceive sound. One example of a hearing prosthesis is a cochlear implant. Conductive hearing loss occurs when the normal mechanical pathways that provide sound to hair cells in the cochlea are impeded, for example, by damage to the ossicular chain or the ear canal. Individuals suffering from conductive hearing loss may retain some form of residual hearing because the hair cells in the cochlea may remain undamaged.

Individuals suffering from hearing loss typically receive an acoustic hearing aid. Conventional hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient. This amplified sound reaches the cochlea causing motion of the perilymph and stimulation of the auditory nerve. Cases of conductive hearing loss typically are treated by means of bone conduction hearing aids. In contrast to conventional hearing aids, these devices use a mechanical actuator that is coupled to the skull bone to apply the amplified sound. In contrast to hearing aids, which rely primarily on the principles of air conduction, certain types of hearing prostheses commonly referred to as cochlear implants convert a received sound into electrical stimulation. The electrical stimulation is applied to the cochlea, which results in the perception of the received sound. Many devices, such as medical devices that interface with a recipient, have structural and/or functional features where there is utilitarian value in adjusting such features for an individual recipient. The process by which a device that interfaces with or otherwise is used by the recipient is tailored or customized or otherwise adjusted for the specific needs or specific wants or specific characteristics of the recipient is commonly referred to as fitting. One type of medical device where there is utilitarian value in fitting such to an individual recipient is the above-noted cochlear implant. That said, other types of medical devices, such as other types of hearing prostheses, exist where there is utilitarian value in fitting such to the recipient.

SUMMARY

In an exemplary embodiment, there is a method, comprising receiving a signal which includes speech data, processing the received signal to identify and/or predict one or more words in the speech data and evoking a hearing percept based in the received signal, wherein the evoked hearing percept includes one or more modified words based on the identification and/or prediction of the one or more words.

In an exemplary embodiment, there is a method, comprising receiving a signal which includes speech data, processing the received signal to identify and/or predict one or more words in the speech data and evoking a hearing percept based in the received signal, wherein the evoked hearing percept is a different hearing percept relative to that which would have been the case in the absence of the identification and/or prediction.

In an exemplary embodiment, there is a system, comprising a hearing prosthesis including a sound capture device and a processing system, wherein the hearing prosthesis is configured to convert sound captured by the system and process a signal based on the captured sound with the processing system and evoke a hearing percept based on output from the processing system based on the signal, wherein the system includes a sound prediction and/or word identification functionality such that the system is configured to predict sound that is captured by the sound capture device.

BRIEF DESCRIPTION OF THE DRAWINGS

Embodiments are described below with reference to the attached drawings, in which.

DETAILED DESCRIPTION

Figure 1:
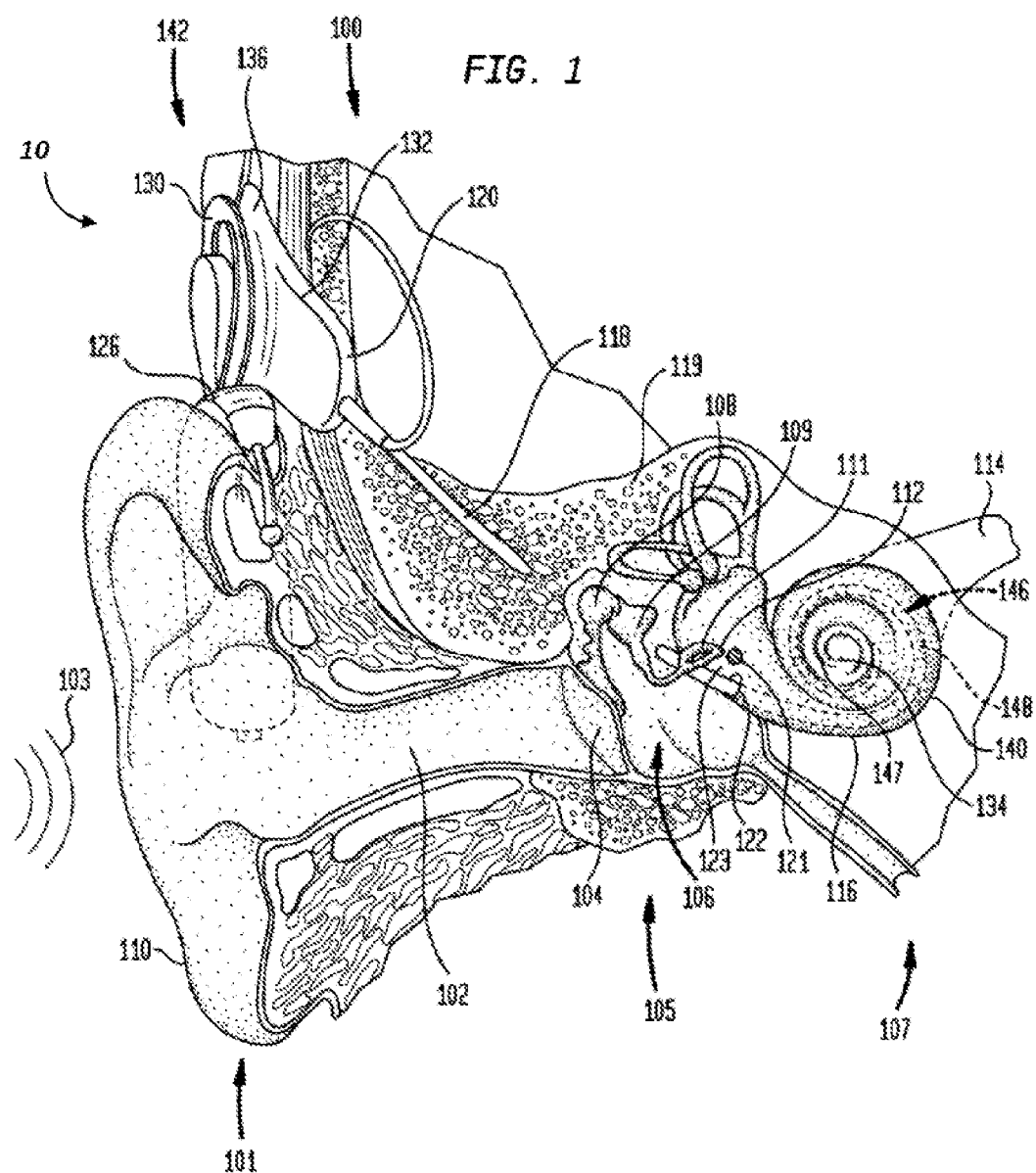
FIG. 1 is a perspective view of an exemplary hearing prosthesis in which at least some of the teachings detailed herein are applicable.

FIG. 1 is a perspective view of a cochlear implant, referred to as cochlear implant 100, implanted in a recipient, to which some embodiments detailed herein and/or variations thereof are applicable. The cochlear implant 100 is part of a system 10 that can include external components in some embodiments, as will be detailed below. Additionally, it is noted that the teachings detailed herein are also applicable to other types of hearing prostheses, such as by way of example only and not by way of limitation, bone conduction devices (percutaneous, active transcutaneous and/or passive transcutaneous), direct acoustic cochlear stimulators, middle ear implants, and conventional hearing aids, etc. Indeed, it is noted that the teachings detailed herein are also applicable to so-called multi-mode devices. In an exemplary embodiment, these multi-mode devices apply both electrical stimulation and acoustic stimulation to the recipient. In an exemplary embodiment, these multi-mode devices evoke a hearing percept via electrical hearing and bone conduction hearing. Accordingly, any disclosure herein with regard to one of these types of hearing prostheses corresponds to a disclosure of another of these types of hearing prostheses or any medical device for that matter, unless otherwise specified, or unless the disclosure thereof is incompatible with a given device based on the current state of technology. Thus, the teachings detailed herein are applicable, in at least some embodiments, to partially implantable and/or totally implantable medical devices that provide a wide range of therapeutic benefits to recipients, patients, or other users, including hearing implants having an implanted microphone, auditory brain stimulators, visual prostheses (e.g., bionic eyes), sensors, etc.

In view of the above, it is to be understood that at least some embodiments detailed herein and/or variations thereof are directed towards a body-worn sensory supplement medical device (e.g., the hearing prosthesis of FIG. 1, which supplements the hearing sense, even in instances when there are no natural hearing capabilities, for example, due to degeneration of previous natural hearing capability or to the lack of any natural hearing capability, for example, from birth). It is noted that at least some exemplary embodiments of some sensory supplement medical devices are directed towards devices such as conventional hearing aids, which supplement the hearing sense in instances where some natural hearing capabilities have been retained, and visual prostheses (both those that are applicable to recipients having some natural vision capabilities and to recipients having no natural vision capabilities). Accordingly, the teachings detailed herein are applicable to any type of sensory supplement medical device to which the teachings detailed herein are enabled for use therein in a utilitarian manner. In this regard, the phrase sensory supplement medical device refers to any device that functions to provide sensation to a recipient irrespective of whether the applicable natural sense is only partially impaired or completely impaired, or indeed never existed.

The recipient has an outer ear 101, a middle ear 105, and an inner ear 107. Components of outer ear 101, middle ear 105, and inner ear 107 are described below, followed by a description of cochlear implant 100.

In a fully functional ear, outer ear 101 comprises an auricle 110 and an ear canal 102. An acoustic pressure or sound wave 103 is collected by auricle 110 and channeled into and through ear canal 102. Disposed across the distal end of ear channel 102 is a tympanic membrane 104 which vibrates in response to sound wave 103. This vibration is coupled to oval window or fenestra ovalis 112 through three bones of middle ear 105, collectively referred to as the ossicles 106 and comprising the malleus 108, the incus 109, and the stapes 111. Bones 108, 109, and 111 of middle ear 105 serve to filter and amplify sound wave 103, causing oval window 112 to articulate, or vibrate in response to vibration of tympanic membrane 104. This vibration sets up waves of fluid motion of the perilymph within cochlea 140. Such fluid motion, in turn, activates tiny hair cells (not shown) inside of cochlea 140. Activation of the hair cells causes appropriate nerve impulses to be generated and transferred through the spiral ganglion cells (not shown) and auditory nerve 114 to the brain (also not shown) where they are perceived as sound.

As shown, cochlear implant 100 comprises one or more components which are temporarily or permanently implanted in the recipient. Cochlear implant 100 is shown in FIG. 1 with an external device 142, that is part of system 10 (along with cochlear implant 100), which, as described below, is configured to provide power to the cochlear implant, where the implanted cochlear implant includes a battery that is recharged by the power provided from the external device 142.

In the illustrative arrangement of FIG. 1, external device 142 can comprise a power source (not shown) disposed in a Behind-The-Ear (BTE) unit 126. External device 142 also includes components of a transcutaneous energy transfer link, referred to as an external energy transfer assembly. The transcutaneous energy transfer link is used to transfer power and/or data to cochlear implant 100. Various types of energy transfer, such as infrared (IR), electromagnetic, capacitive and inductive transfer, may be used to transfer the power and/or data from external device 142 to cochlear implant 100. In the illustrative embodiments of FIG. 1, the external energy transfer assembly comprises an external coil 130 that forms part of an inductive radio frequency (RF) communication link. External coil 130 is typically a wire antenna coil comprised of multiple turns of electrically insulated single-strand or multi-strand platinum or gold wire. External device 142 also includes a magnet (not shown) positioned within the turns of wire of external coil 130. It should be appreciated that the external device shown in FIG. 1 is merely illustrative, and other external devices may be used with embodiments.

Cochlear implant 100 comprises an internal energy transfer assembly 132 which can be positioned in a recess of the temporal bone adjacent auricle 110 of the recipient. As detailed below, internal energy transfer assembly 132 is a component of the transcutaneous energy transfer link and receives power and/or data from external device 142. In the illustrative embodiment, the energy transfer link comprises an inductive RF link, and internal energy transfer assembly 132 comprises a primary internal coil 136. Internal coil 136 is typically a wire antenna coil comprised of multiple turns of electrically insulated single-strand or multi-strand platinum or gold wire.

Cochlear implant 100 further comprises a main implantable component 120 and an elongate electrode assembly 118. In some embodiments, internal energy transfer assembly 132 and main implantable component 120 are hermetically sealed within a biocompatible housing. In some embodiments, main implantable component 120 includes an implantable microphone assembly (not shown) and a sound processing unit (not shown) to convert the sound signals received by the implantable microphone in internal energy transfer assembly 132 to data signals. That said, in some alternative embodiments, the implantable microphone assembly can be located in a separate implantable component (e.g., that has its own housing assembly, etc.) that is in signal communication with the main implantable component 120 (e.g., via leads or the like between the separate implantable component and the main implantable component 120). In at least some embodiments, the teachings detailed herein and/or variations thereof can be utilized with any type of implantable microphone arrangement.

Main implantable component 120 further includes a stimulator unit (also not shown) which generates electrical stimulation signals based on the data signals. The electrical stimulation signals are delivered to the recipient via elongate electrode assembly 118.

Elongate electrode assembly 118 has a proximal end connected to main implantable component 120, and a distal end implanted in cochlea 140. Electrode assembly 118 extends from main implantable component 120 to cochlea 140 through mastoid bone 119. In some embodiments electrode assembly 118 may be implanted at least in basal region 116, and sometimes further. For example, electrode assembly 118 may extend towards apical end of cochlea 140, referred to as cochlea apex 134. In certain circumstances, electrode assembly 118 may be inserted into cochlea 140 via a cochleostomy 122. In other circumstances, a cochleostomy may be formed through round window 121, oval window 112, the promontory 123 or through an apical turn 147 of cochlea 140.

Electrode assembly 118 comprises a longitudinally aligned and distally extending array 146 of electrodes 148, disposed along a length thereof. As noted, a stimulator unit generates stimulation signals which are applied by electrodes 148 to cochlea 140, thereby stimulating auditory nerve 114.

Figure 2A:
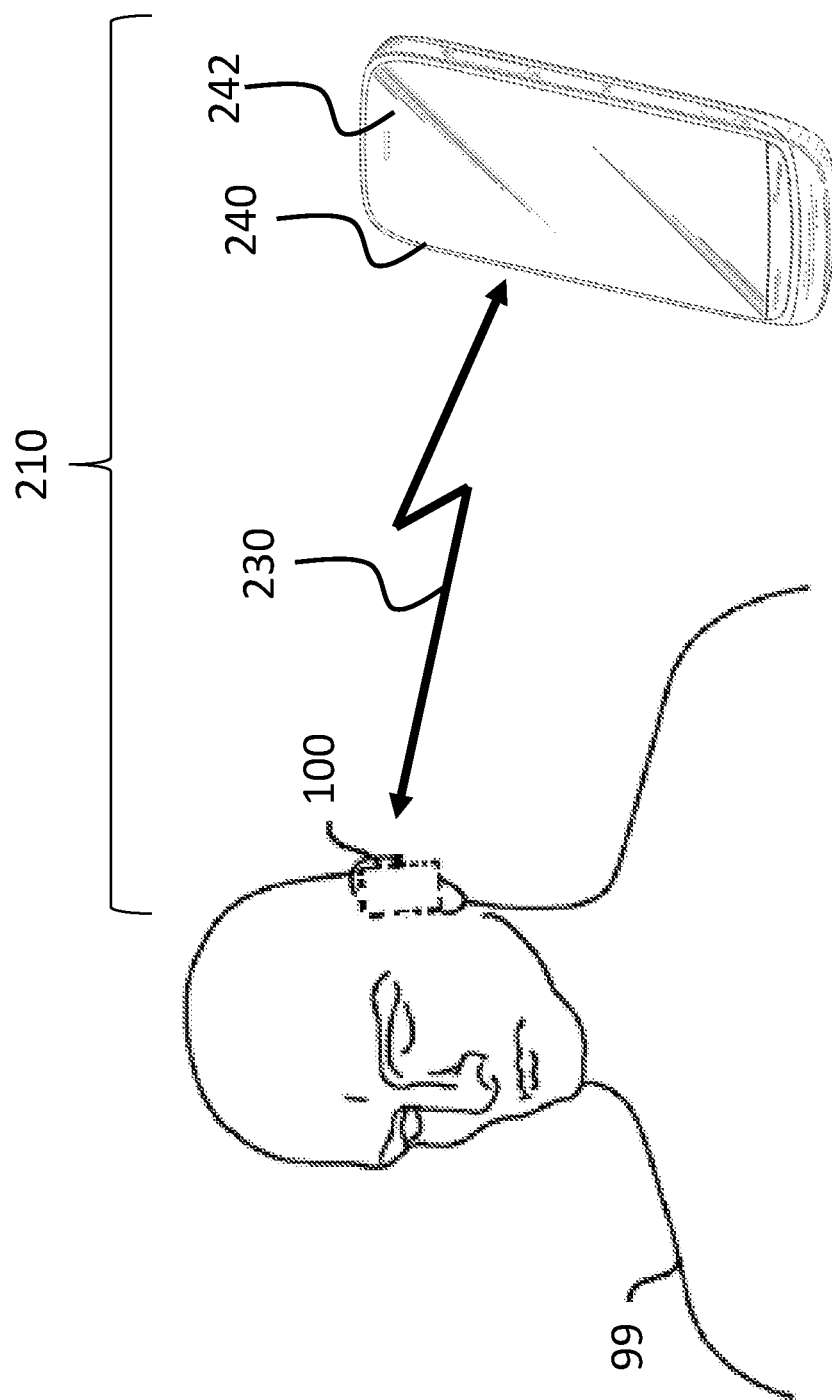
FIGS. 2A and 2B presents an exemplary system including a hearing prosthesis and a remote device in the form of a portable handheld device.

FIG. 2A depicts an exemplary system 210 according to an exemplary embodiment, including hearing prosthesis 100, which, in an exemplary embodiment, corresponds to cochlear implant 100 detailed above, and a portable body carried device (e.g. a portable handheld device as seen in FIG. 2A (a smart phone), a watch, a pocket device, any body carried device, etc.) 240 in the form of a mobile computer having a display 242. The system includes a wireless link 230 between the portable handheld device 240 and the hearing prosthesis 100 (the link can be wired in some embodiments). In an exemplary embodiment, the hearing prosthesis 100 is an implant implanted in recipient 99 (as represented functionally by the dashed lines of box 100 in FIG. 2A). Again, it is noted that while the embodiments detailed herein will be described in terms of utilization of a cochlear implant, the teachings herein can be applicable to other types of prostheses.

In an exemplary embodiment, the system 210 is configured such that the hearing prosthesis 100 and the portable handheld device 240 have a symbiotic relationship. In an exemplary embodiment, the symbiotic relationship is the ability to display data relating to, and, in at least some instances, the ability to control, one or more functionalities of the hearing prosthesis 100 and/or influence the operation of the overall system, as will be described in greater detail below. In an exemplary embodiment, this can be achieved via the ability of the handheld device 240 to receive data from the hearing prosthesis 100 via the wireless link 230 (although in other exemplary embodiments, other types of links, such as by way of example, a wired link, can be utilized). As will also be detailed below, this can be achieved via communication with a geographically remote device in communication with the hearing prosthesis 100 and/or the portable handheld device 240 via link, such as by way of example only and not by way of limitation, an Internet connection or a cell phone connection. In some such exemplary embodiments, the system 210 can further include the geographically remote apparatus as well. Again, additional examples of this will be described in greater detail below.

As noted above, in an exemplary embodiment, the portable handheld device 240 comprises a mobile computer and a display 242. In an exemplary embodiment, the display 242 is a touchscreen display. In an exemplary embodiment, the portable handheld device 240 also has the functionality of a portable cellular telephone. In this regard, device 240 can be, by way of example only and not by way of limitation, a smart phone as that phrase is utilized generically. That is, in an exemplary embodiment, portable handheld device 240 comprises a smart phone, again as that term is utilized generically.

The phrase "mobile computer" entails a device configured to enable human-computer interaction, where the computer is expected to be transported away from a stationary location during normal use. Again, in an exemplary embodiment, the portable handheld device 240 is a smart phone as that term is generically utilized. However, in other embodiments, less sophisticated (or more sophisticated) mobile computing devices can be utilized to implement the teachings detailed herein and/or variations thereof. Any device, system, and/or method that can enable the teachings detailed herein and/or variations thereof to be practiced can be utilized in at least some embodiments. (As will be detailed below, in some instances, device 240 is not a mobile computer, but instead a remote device (remote from the hearing prosthesis 100. Some of these embodiments will be described below).)

In an exemplary embodiment, the portable handheld device 240 is configured to receive data from a hearing prosthesis and present an interface display on the display from among a plurality of different interface displays based on the received data. Exemplary embodiments will sometimes be described in terms of data received from the hearing prosthesis 100. However, it is noted that any disclosure that is also applicable to data sent to the hearing prostheses from the handheld device 240 is also encompassed by such disclosure, unless otherwise specified or otherwise incompatible with the pertinent technology (and vice versa).

It is noted that in some embodiments, the system 210 is configured such that cochlear implant 100 and the portable device 240 have a relationship. By way of example only and not by way of limitation, in an exemplary embodiment, the relationship is the ability of the device 240 to serve as a remote microphone for the prosthesis 100 via the wireless link 230. Thus, device 240 can be a remote mic. That said, in an alternate embodiment, the device 240 is a stand-alone recording/sound capture device. In another exemplary embodiment, the device 240 adds processing power and/or software to the overall system. As will be detailed below, an embodiment includes a word production and/or sound prediction and/or word identification functionality, which may reside on the prosthesis 100 and/or on device 240. The device 240 can work with the prosthesis 100 to achieve the goals herein.

It is noted that in at least some exemplary embodiments, the device 240 corresponds to an Apple Watch™ Series 1 or Series 2, as is available in the United States of America for commercial purchase as of Jun. 6, 2018. In an exemplary embodiment, the device 240 corresponds to a Samsung Galaxy Gear™ Gear 2, as is available in the United States of America for commercial purchase as of Jun. 6, 2018. The device is programmed and configured to communicate with the prosthesis and/or to function to enable the teachings detailed herein.

Figure 2B:
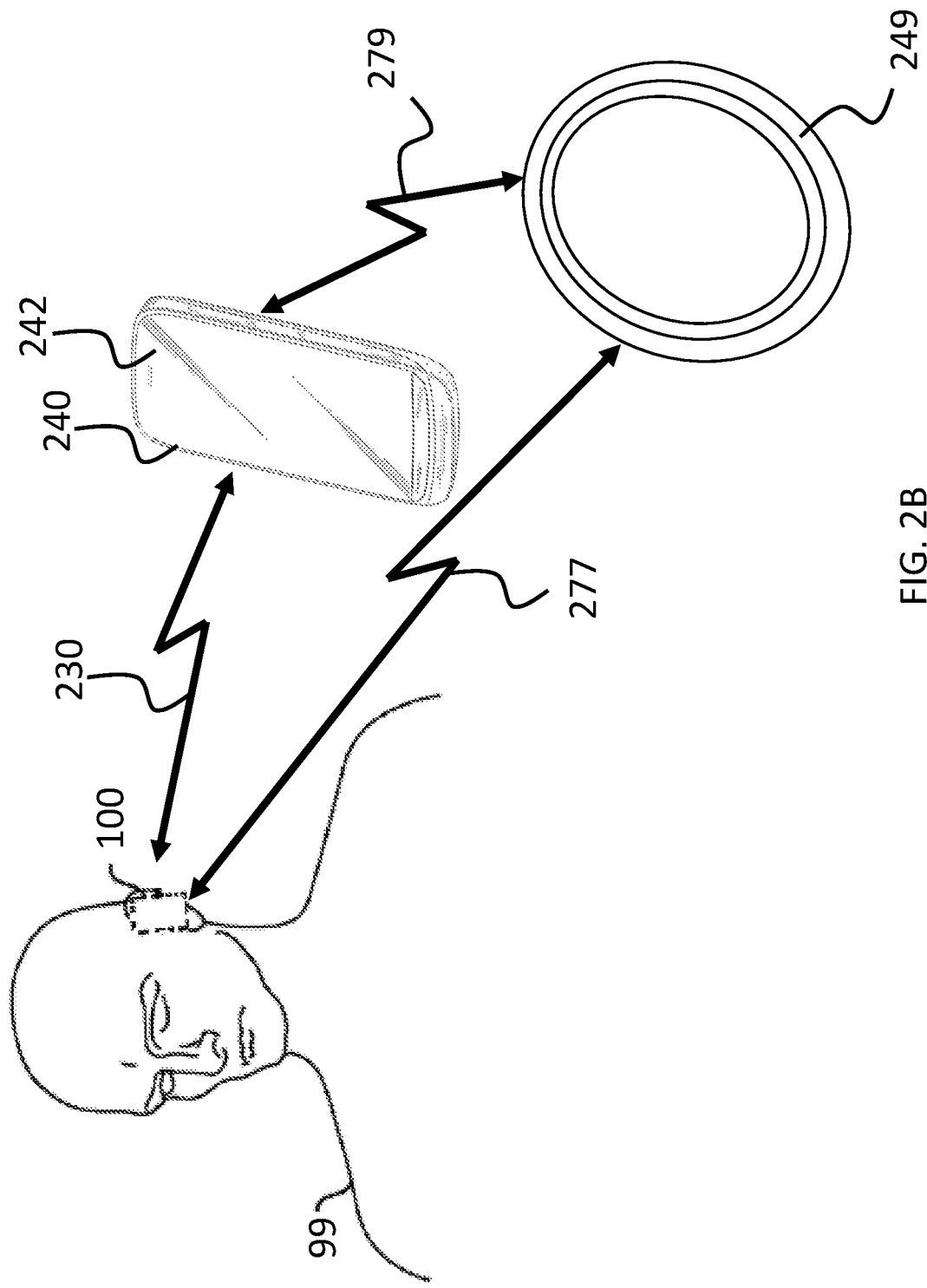

In an exemplary embodiment, a telecommunication infrastructure can be in communication with the hearing prosthesis 100 and/or the device 240. By way of example only and not by way of limitation, a telecoil 249 or some other communication system (Bluetooth, etc.) is used to communicate with the prosthesis and/or the remote device. FIG. 2B depicts an exemplary quasi-functional schematic depicting communication between an external communication system 249 (e.g., a telecoil), and the hearing prosthesis 100 and/or the handheld device 240 by way of links 277 and 279, respectively (note that FIG. 2B depicts two-way communication between the hearing prosthesis 100 and the external audio source 249, and between the handheld device and the external audio source 249—in alternate embodiments, the communication is only one way (e.g., from the external audio source 249 to the respective device)).

It is briefly noted that in an exemplary embodiment, as will be described below, the cochlear implant 100 and/or the device 240 is utilized to capture speech/voice of the recipient and/or people speaking to the recipient. Further as will be described below, the implant 100 and/or the device 240 can be used to log data, which data can be used to improve the word prediction/word identification/sound prediction functionality described below.

As will be detailed below, element 249 can represent a portal to communicate with a remote server, etc., that can enable some of the teachings herein. Specifically, by way of example only and not by way of limitation, via the aforementioned links with element 249, captured voice and/or data associated there with as well as data that is logged by the system 210, or just the implant 100, can be communicated to a remote system that can be utilized to implement some of the teachings herein. For example, element 249 can enable communication with the processing suite of the system detailed below (which includes a recommendation engine, etc., as will be detailed below), and device 240 can be in the input, output and/or the input/output suite(s) of the system.

Some embodiments are directed to, by way of example and not by way of limitation, intelligent voice recognition to enhance user performance of some hearing prostheses. Some embodiments utilize recognition techniques that enable the recognition of words being said in incoming speech that is captured by, for example, a hearing prosthesis, and the prosthesis "clean it up" before presenting it to the recipient. This can include, in some embodiments, presenting the captured speech without noise (or with whatever background noise is utilitarian), presenting the captured speech without an accent or with an accent to which the user is accustomed (e.g., adding an Australian accent to the speech captured from an American or British speaker, or removing an Australian accent from speech that is used to evoke a hearing percept in an American, or adding a British accent, or at least British linguistic features, to a non-native English language speaker as many such people are taught "British English" instead of "American English," etc.) and/or presenting the speech to the recipient at a given volume vs. another volume and/or adjusting other parameters in any utilitarian manner that can improve or otherwise has utilitarian value with respect to speech recognition performance (it could be to make the task of listening less effortful). Some embodiments include translating the captured speech from one language to another if desired and/or providing a given sentence or paragraph or phrase in a simpler or more easily understood form.

Some embodiments include performing speech recognition in hearing instruments in real time.

Figure 3:
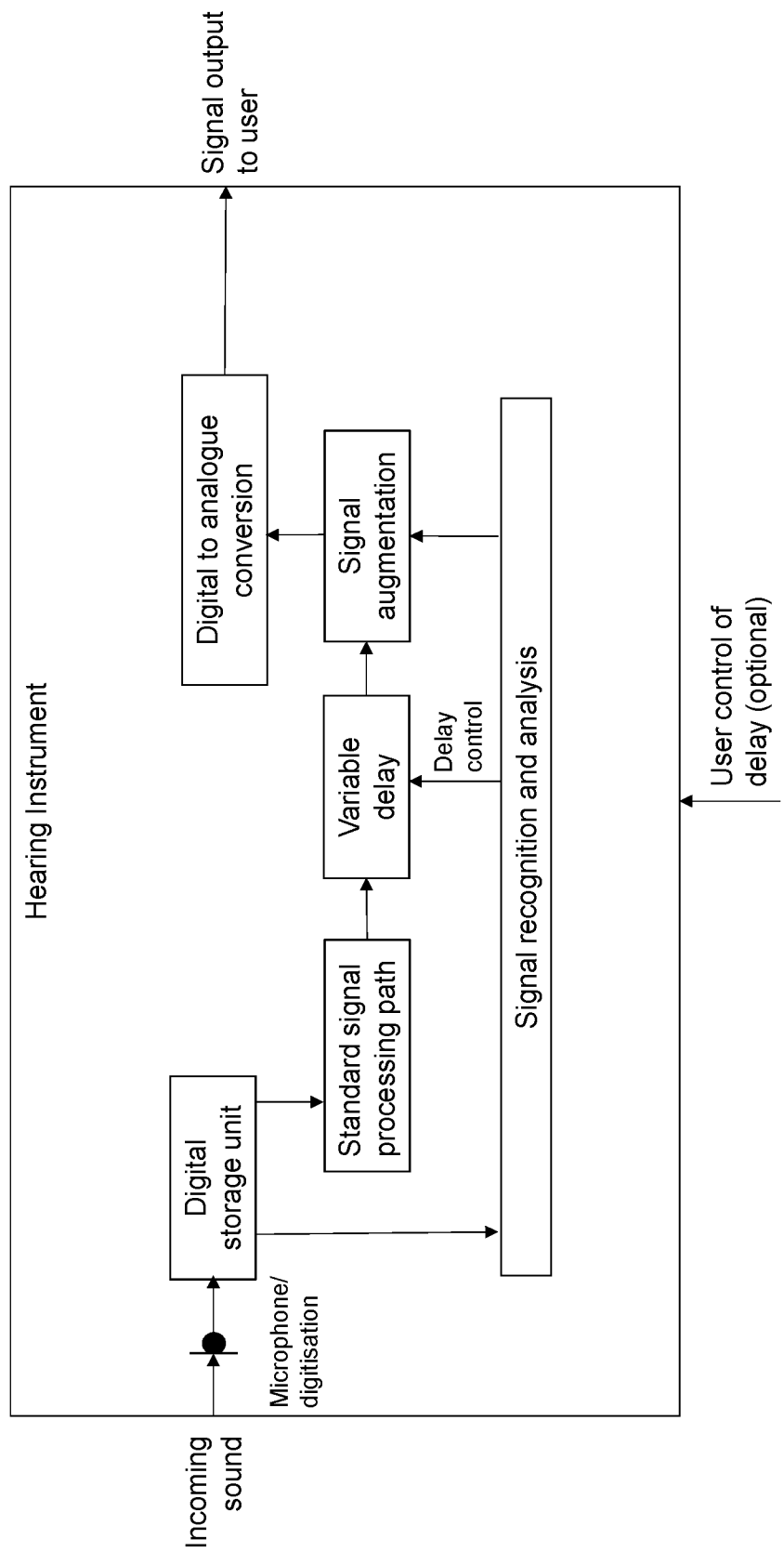
FIG. 3 presents a functional block diagram of an exemplary embodiment.

FIG. 3 presents a functional diagram of an exemplary embodiment. Here, there is a modification to a standard hearing prosthesis, where the standard signal processing path can include a standard sound/speech processor, such as those commercially available in cochlear implants, or other types of hearing prostheses. (It is noted that the teachings herein are applicable to other types of sensory prostheses, such as, for example, retinal implants, where the signal processing path would include a light processor, for example. Thus, any disclosure herein of a hearing prosthesis and/or a sound processor and/or a sound processing path corresponds to a disclosure of an alternate embodiment where the hearing prosthesis is instead a vision prosthesis, such as a retinal implant, which includes, for example, a light processor, and any disclosure herein of a sound processor under a sound processing path corresponds to an alternative embodiment of a light processing path.)

In this exemplary embodiment, the variable delay device is included in the hearing prostheses, and is configured to impart variable delay on to the output of the standard signal processing path with respect to the flow of the signal through the hearing instrument. In an exemplary embodiment, the variable delay device can be a memory unit that stores the received input from the standard signal processing path, and permits such to be retrieved shortly thereafter, in accordance with the time frames that will be detailed below. The variable delay can be part of the sound processor and/or signal processor that is utilized in the prosthesis, or any system that can enable a delay to be utilized in accordance with at least some exemplary embodiments. A delay circuit can be utilized. In this exemplary embodiment, a user can control the amount of delay, such as via input into the prosthesis whether such is an input that corresponds to a time frame or otherwise is an input that is indicative of an ultimate desire of the recipient, where the prosthesis determines what the delay should be based on that input. As seen, the hearing prosthesis is configured to augment the signal based on input from the signal recognition and analysis block. This will be described in greater detail below, but, in an exemplary embodiment, can be a chip or a processor or a computing device that includes therein software for speech recognition and/or sound recognition, etc. Additional details of this will be described below. In any event, in an exemplary embodiment, the signal recognition and analysis block can be utilized to determine the amount of delay, and can provide a control signal to the variable delay block to adjust the delay and/or remove the delay, again in accordance with the teachings below. Signal augmentation can correspond to any of the actions herein with respect to how the signal that is based upon the captured sound is modified or otherwise how the signal is replaced with another signal, again as will be described in greater detail below. The digital to analog conversion is an optional example, and it is noted that some embodiments can be utilized herein with respect to a purely analog system. Indeed, the digital storage unit is also optional, as well as the microphone and the analog-to-digital converter associated therewith (not shown, but complied with respect to the indicia "digitization"). The digital storage unit can instead be an analog storage unit, and may not be present in any eventuality as well in some embodiments. In an exemplary embodiment, the storage unit can be a memory unit or a circuit that includes transistors etc. or a set of chips, etc.

Still with respect to the embodiment of FIG. 3, the output of the signal augmentation (which includes varying the signal and replacing the signal with a new signal, again as will be described in greater detail below) is ultimately used to provide an output to the use/recipient. In an exemplary embodiment, this can be electrical stimulation as applied via a cochlear implant electrode array. In another exemplary embodiment, this can be vibratory output such as is outputted by a bone conduction device. In this regard, the hearing instrument/hearing prostheses can be an active transcutaneous bone conduction device, a passive transcutaneous bone conduction device and/or a percutaneous bone conduction device. In an exemplary embodiment the output can be mechanical output from a middle ear implant device or the like and/or can be mechanical output into a device that is located inside the cochlea to mechanically stimulate the cochlea. In an exemplary embodiment, the signal output can instead be provided to a receiver of a traditional hearing aid such as in the ear hearing aid or a hearing aid that includes a speaker that is located in the ear canal. Also, as noted above, the output can be to a retinal implant device. The point is, any disclosure herein with respect to a feature of a given prosthesis that has analogous features in a different type of prostheses as detailed herein corresponds to a disclosure of an alternate embodiment of such, unless otherwise noted.

In an exemplary embodiment, the signal recognition and analysis block of FIG. 3 can be a word identification and/or word prediction device. In an exemplary embodiment, the signal recognition and analysis block of FIG. 3 can correspond to a processor or a computer chip or to a computing device that is configured to identify and/or predict words and/or can be a component, such as an input and/or output device that is in signal communication or otherwise can be placed into signal communication with a remote device that has the noted functionality associated with word recognition and/or word prediction.

It is noted that while many embodiments detailed herein are directed to processing that results in or otherwise requires or otherwise utilizes processing delay, it is noted that other embodiments can be implemented without processing delay and/or without processing delay where the statistically average recipient (e.g., the human factors engineering 50 percentile male or female between 18 and 45 years old born in an residing United States, Canada, Australia, an EU country, the UK, France, Germany, Japan, Italy, Australia, New Zealand, or India—hereinafter, any reference to a statistically average recipient corresponds to a human factors engineering that the percentile male or female born in and residing in one of those countries) would notice such, all other things being equal. In at least some exemplary embodiments that are implemented without processing delay, the predictions and/or identifications can be based entirely on the existing sound stream. In embodiments that are implemented with a delay, by way of example only and not by way of limitation, or at least a relatively significant delay, the predictions can be based on past and/or future sounds (any disclosure herein of a sound corresponds to a disclosure of a word and vice versa unless otherwise noted) and are therefore more accurate.

Figure 4:
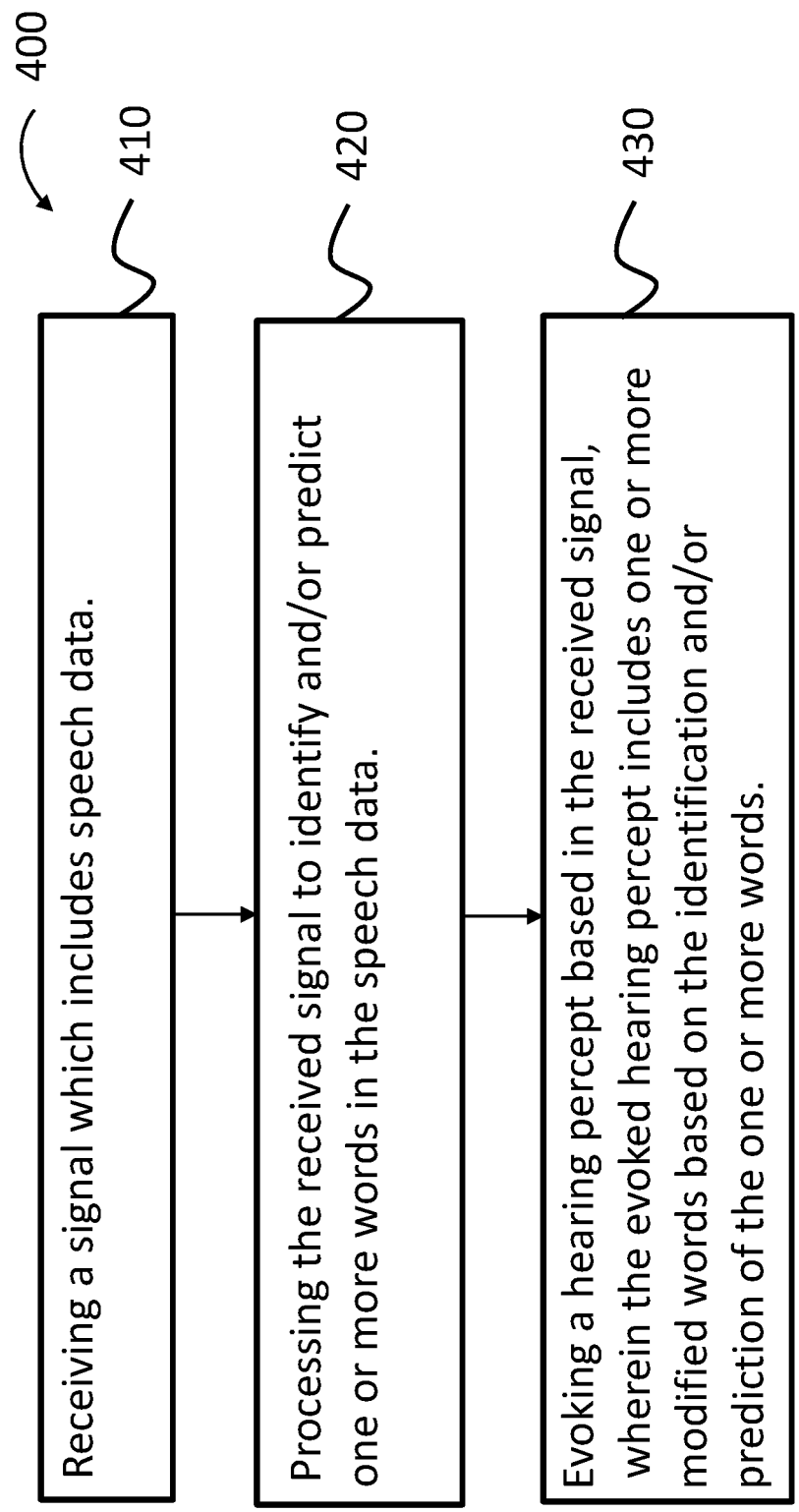
FIGS. 4-6 present exemplary flowcharts for exemplary methods.

Briefly, FIG. 4 presents an exemplary flowchart for an exemplary method, method 400, which includes method action 410, which includes receiving a signal which includes speech data. In an exemplary embodiment, the signal is received from the microphone of FIG. 3. In an exemplary embodiment, the signal is the signal that is received from a microphone, although the signal can be a different signal which is based on a signal from a microphone (e.g., such as might be the case with respect to preprocessing and/or the output of a sound processor alike, depending on how the teachings are implemented herein, or with respect to a remote processing embodiment, where, for example, the hearing prostheses communicates with a device that is located remotely, and the signal from the microphone is utilized to develop another signal which is what is ultimately analyzed or otherwise evaluated, although that said, same signal can be transmitted to the remote component). Moreover, the signal can be received from another device, such as a USB port, etc., where, for example, the speech data does not result from live speech, but instead, could be speech that is prerecorded, and/or in a scenario where, for example, the speech originates at a remote location and is transmitted to the recipient electronically, such as would be the case with respect to a television broadcast or a radio broadcast, etc. where, for example, the prostheses is in wire communication and/or in signal communication with an output device that transmits or otherwise provides the speech data (e.g., thus bypassing the microphone, for example). As long as the signal includes speech data, it is covered by method action 410.

Method 400 also includes method action 420, which includes processing the received signal to identify and/or predict one or more words in the speech data. This can be done by any processor that is configured to do such, such as a processor and/or a computer and/or a computer chip and/or artificial intelligence devices and/or a trained expert system, etc. In an exemplary embodiment, the action 420 is executed utilizing a computing device that includes word identification/word recognition software (e.g., such as that used on a smart phone when one speaks into the smart phone and the smart phone converts the captured voice sound to text, or the Dragon™ software, etc., or any variation thereof) that is utilized in voice to text applications and/or in spelling correction applications, etc. Note further that the method action disclosed herein can also include utilizing systems that "learn" from the past and/or from user experiences, again, such as the Dragon™ software system, etc. Moreover, as noted above, systems can also include word prediction techniques. In an exemplary embodiment, the device system and/or method that is utilized to execute method action 420 can be a computing device that includes software for word prediction, such as that which is found with web browsers and/or that which is found in smart phones, etc. Any device, system, and/or method that can enable word identification and/or word recognition and/or word prediction can be utilized in at least some exemplary embodiments.

Method 400 further includes method action 430, which includes evoking a hearing percept based in the received signal, wherein the evoked hearing percept includes one or more modified words based on the identification and/or prediction of the one or more words.

It is briefly noted that method 400 can be executed, in some embodiments, completely within a self-contained hearing prosthesis, such as a cochlear implant, or any of the other hearing prostheses detailed herein. It is also noted that some embodiments include methods where the speech data and the features associated with voice are replaced with features associated with light, and the percept that is evoked as a sight percept that includes one or more modified visions or images based on the identification and/or prediction providing that such is enabled by the art.

Accordingly, in an exemplary embodiment, the processing of method action 420 includes utilizing speech recognition software to identify the one or more words.

Embodiments can include the utilization of word prediction techniques, as distinguished from word completion techniques that correspond to those that are often utilized in web browsers, smart phones, etc., where, as the user starts to type a word, the browser or device offers words that the user might be trying to type. Word prediction techniques take completion techniques further by "predicting" a word that might come next in speech. The prediction is based on on-going analyses of speech (by AI or other techniques embodiments include on board artificial intelligence devices and systems that are included in the hearing prosthesis and/or embodiments where the artificial intelligence systems and devices are located remotely, which can be utilized to implement the word recognition and/or word prediction techniques disclosed herein). By identifying and/or analyzing words in the speech, the next word or words can be predicted.

In some embodiments, the teachings herein can be used to predict with a relatively high level of certainty that the next word will be one of "n" words. Embodiments of the teachings detailed herein can respond in respond in different ways. In some embodiments, the word with the highest level of certainty is selected. In other embodiments, the words are combined such that the predicted levels for each frequency bin reflect, e.g., an average predicted level. Still other embodiments apply a 'least common denominator' approach such that, for instance, only the areas of overlap for predicted words are treated as the level for the predicted word.

In some embodiments, prediction of the next word is not possible due to system latency. In such embodiments, some embodiments predict a word or words (e.g., 2 or 3 or 4 or 5 or 6 or 7 or 8 or more or any value or range of values therebetween in one increment) after the next word and/or after the next 2 or 3 or 4 or 5 or 6 or 7 words, or any value or range of value therebetween in 1 increment (e.g., 3 to 5, 2 to 6, etc.) to be processed by the prosthesis with sufficient accuracy to provide a signal processing benefit. In some embodiments, the prediction includes or is limited to 'further speech," speech in a tonal language, music, etc. In some embodiments, some predictions are based on identification of prior words. In some instance, e.g., when prediction of a next or subsequent word is not sufficiently certain, these other predictions still provide a noise reduction or other signal processing benefit (e.g., updating/maintaining the scene classifier, displaying past words and possible next words to a recipient via an app, and so on). That is, even if the prediction is not sufficiently certain to, for example, have a word replaced with some other word, the prediction can still be used for other non-comprehension based implementations.

In some embodiments, the speech/word identification/prediction techniques are used to effectively change the hearing percept that results from the speech data relative to that which would otherwise be the case. Accordingly, in an exemplary embodiment of method 400, at least one of (i) the received signal is modified to produce a word that sounds differently relative to that which would have been the case in the absence of the modification, or (ii) a new signal is produced that is provided to a device that evokes the hearing percept, which new signal results in the production of a word that sounds different relative to that which would have been the case if the signal was used by the device. With respect to the first scenario, this can include removing noise from the signal or increasing or decreasing the amplitude of certain frequencies relative to other frequencies, smoothing the frequencies, increasing a sharpness, etc. Under the second scenario, a new signal is produced. By way of example only and not by way of limitation, say for example the received signal included the phrase, "to be or not to be." The portion of the signal that included "to be or" can be maintained, but a new signal based on a prerecorded/prestored data for the word "not" could be interjected/be inserted into the speech processing stream, and then the signal could revert back to the underlying signal. Some additional features of this will be described below. Briefly, it is noted that the concept here is that the prosthesis or other system could determine that the word "not" should be between the phrases "to be or" and "to be." Upon a determination of such, a determination can also be made whether or not the underlying signal could be modified or otherwise in its unmodified form would produce a desired hearing percept of the word "not." If a determination is made that it would not provide a desired hearing percept, the signal would be replaced with a new signal that is more likely to provide the desired percept. That said, the same principle of operation can be used with respect to simply modifying the signal to produce a word that sounds differently than that which would otherwise be the case. The ideas to ensure or otherwise improve the likelihood that the hearing percept would be of the word "not" as opposed to some other word. Utilizing the word prediction and/or word identification teachings herein, such can be better achieved.

Indeed, in some exemplary embodiments, the word recognition system might replace the entire phrase or otherwise modify the entire signal to improve the likelihood that the hearing percept will be "to be or not to be." In this regard, the system could have a catalog of known or commonly used phrases that it could rely upon to identify and/or predict words. Moreover, the action of identifying and/or predicting one or more words in the speech data can include identifying and/or predicting one or more sentences in the speech data, or two or three or four or five or six or seven or eight or nine or 10 or 11 or 12 or 13 or 14 or 15 words, or any value or range of values in 1 increment (at one time, as opposed to, for example, over the course of minutes, which would be simply counting the number of times that the system operates).

To be clear, any signal processing regime or word supplement or word replacement regime that can improve upon the hearing percept that would be evoked based on word identification and/or word prediction can be utilized in at least some exemplary embodiments, whether such is noise reduction, gain amplitude modification, or replacement of a signal with a completely new signal which signal could be artificially generated. Moreover, as will be explained below, some exemplary embodiments where the recipient has trouble with certain words, some words can be replaced with other words or other sounds that might be considered "nonsense" words except that the word will be words that the recipient will more easily recognize relative to other words. In this regard, because of the limitations of the hearing prosthesis, it may be difficult for a recipient to discriminate or otherwise identify certain words, especially when such words are spoken relative to other words. For example, the word "forty" and the word "thirty" can sometimes sound the same or otherwise be difficult to distinguish depending on how the word is perceived. In this regard, the ability of a cochlear implant to evoke a hearing percept is limited to certain frequencies, and this limitation could compound the difficulty to distinguish between those two words. Utilizing the word recognition and/or word production techniques herein, the word "thirty" can be instead replaced with "3" and "zero" or "ytriht" (thirty spelled backwards), with "forty" always "forty." The goal is to improve the comprehension in this instance. No one will know of the "awkwardness" of the hearing percept except the individual utilizing the prosthesis. But if the modification of the words results in better comprehension, such can be utilitarian.

As noted above, the teachings detailed herein can be utilized to modify the hearing percept in various manners. In this regard, in an exemplary embodiment, the signal is modified to produce a word with a different accent relative to that which would have been the case in the absence of the modification and/or a new signal is produced that is provided to a device that evokes the hearing percept, which new signal results in the production of a word with a different accent relative to that which would have been the case if the signal was used by the device.

Again, any regime that can have utilitarian value vis-à-vis changing or otherwise adjusting the hearing percept that would result based on word recognition and/or word prediction relative to that which is otherwise can be utilized in at least some exemplary embodiments.

In view of the utilitarian value with respect to enhancing or otherwise improving comprehension over that which would otherwise be the case, the action of processing the received signal of method action 420 is, in some embodiments, executed in real time during a conversation between the person in which the hearing percept is evoked (recipient of the hearing prosthesis) and a person who generated the speech data (a person speaking to the recipient, for example).

Some embodiments according to the teachings detailed herein utilize speech recognition devices, systems, and methods via the utilization of a high degree of processing power and large amounts of memory, which, in some embodiments, are all contained in the hearing prosthesis, which can be located in a device that is in signal communication with the hearing prosthesis (e.g., the smart phone, or smart watch, or a remote computer) or otherwise located as a non-body worn component of the hearing prosthesis (e.g., a pocket worn or belt carried signal processor, the concept of which has been replaced by behind the ear devices in view of the signal processors becoming smaller and less power-hungry over the years—the older larger chassis could be utilized to support larger and more power-hungry processors which may not necessarily be compatible with a smaller behind the ear device chassis).

In an exemplary embodiment, the teachings herein include speech recognition or speech prediction on or related to entire sentences or at least more than half, ⅔rds, three-quarters, 85 or 90% of a sentence (on average (mean, median and/or mode)). Speech recognition can use, in some embodiments, evaluation/identification of incoming syllables and/or phonemes that are not in a random sequence, and/or that are strung together to make words and sentences, some of which are more likely to occur than others. Thus, embodiments can utilize parts of sentences to provide context for individual words of the sentence. In speech recognition terms, the other words in a sentence can increase the likelihood that any particular word will be correctly identified. The same effect can apply to syllable recognition versus word recognition. Embodiments can utilize the fact that syllables are spoken as parts of words to increase the likelihood of proper identification.

In an exemplary embodiment, the action of processing is correlated with a noticeable delay in the hearing percept that is noticed by the person in which the hearing percept is evoked relative to that which would be the case in the absence of the processing. Conversely, in an exemplary embodiment, the processing is not correlated with a noticeable delay in the hearing prosthesis noticed by the person in which the hearing percept is evoked. In an exemplary embodiment, the delay is a result of the processing to execute method action 420 and/or the other actions herein. That said, in an alternate embodiment, as noted above, the delay is a result of a recipient and/or user other healthcare professional purposely causing a delay so as to improve the effectiveness of the method actions under the devices that are utilized to implement such. Hence, in both scenarios, there is a correlation between the processing and the delay and/or the absence of the delay.

In an exemplary embodiment, the delay is a delay that is delta to that which would be the case in the absence of the identification and/or prediction. That is, in an exemplary embodiment, this is relative to that which would be the case if normal/standard signal processing (e.g., signal processing is as known in the art, such as for speech processing, without the innovative teachings herein relating to speech identification and/or production) was utilized to evoke the hearing percept, all other things being equal.

In an exemplary embodiment, there is a delay of 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 58, 60, 61, 62, 63, 64, 65, 66, 67, 68, 69, 70, 71, 72, 73, 74, 75, 76, 77, 78, 79, 80, 85, 90, 95, 100, 120, 140, 160, 180, 200, 225, 250, 275, 300, 350, 400, 450, 500, 550, 600, 700, 800, 900, 1000, 1250, 1500, 1750, 2000, 2250, 2500, 3000, 3500, 4000, 4500, 5000, 5500, 6000, 7000, 8000, 9000, 10000 or more milliseconds, or any value or range of values therebetween in 0.1 millisecond increments (e.g., 30.7 to 88.4 milliseconds, 707 to 4444 milliseconds, 804.3 milliseconds, 589.0 milliseconds, etc.).

The above delay, which can be introduced, can have utilitarian value vis-à-vis improving the utility of speech recognition, such as, for example, enabling the remainder of a word or a sentence to be uttered before the prediction of the words or syllables in that sentence is made. In this regard, sound processing strategies can, in some instances, perform better if a delay is introduced into the sound path or is utilized in conjunction with the teachings herein to enable or allow for improved sound processing to occur, relative to that which would otherwise be the case without the delay/normal processing time.

This is counter to the standard, as delay is avoided in hearing instruments because it can interfere with lip synching, interrupts conversation flow and can be distracting to users. Indeed, modern cochlear implant and hearing aid sound processing strategies and/or other hearing prostheses deliberately avoid introducing significant delay between the received sound at the microphone and the outputted sound at the loud speaker or electrode array. This is because it is generally recognized that if this delay exceeds a few tens of milliseconds, the user is able to perceive the timing difference between vision and sound and this becomes distracting or annoying to the user. When listening to and visually observing speech, this is known as the "lip synching" problem—the speech is not synchronized to the lip movement of the speaker. For hearing impaired individuals this is especially a problem because they typically rely on lip reading more than the general population. Accordingly, the art eschews such delays, and strives to minimize such delays. Conversely, the teachings herein can be applied where the deleterious effects of the delay can be counterbalanced by the improvement and comprehension or otherwise improved listening experience resulting from the teachings detailed herein.

Moreover, there are in fact some instances where a delay is less deleterious, or not deleterious at all. Such can be when listening to podcasts, the radio or broadcast speech of any kind. In telephone conversations too, it may be acceptable to introduce a small delay (for example less than one second) so that multiple syllables can be acquired and/or stored and analyzed to improve the performance of the word recognition effort. Indeed, the disruption caused by delay varies depending on the listening situation and it may be that a range of different delays could be used to obtain the most utilitarian speech recognition performance in any given listening situation.

For example, for broadcast video (sound and pictures), if the broadcast system is aware of the amount of delay being introduced by the hearing instrument it can compensate by delaying the broadcast of the pictures by the same amount as the delay in audio processing so that the sound and pictures are synchronized. Accordingly, embodiments extend from beyond the applicability to only hearing prosthesis sound capture scenarios to an overall system that synchronizes the hearing percept that is evoked based on the teachings detailed herein with other media. By way of example only and not by way of limitation, there can be a system that includes a video and audio system, such as a television or video conferencing system, where a delay is also built into the video to synchronize the hearing percept with the video. The system can communicate with the hearing prostheses. In at least some exemplary embodiments, if communication between the broadcast device and the hearing instrument is available, it can be, in some instances, be possible to match the delays of both audio and visual data streams to synchronize the two. In other words, the visual data stream can be deliberately delayed to allow for the required delay in audio processing to improve the sound recognition quality.

Moreover, the system can have the speech recognition and/or prediction features, and can in some embodiments, include the sound processing features, where the resulting signal is then provided to the hearing prosthesis as if it was a normal signal that was provided otherwise captured during normal use of the prostheses. In this regard, some embodiments are completely separate from the hearing prosthesis except for the fact that a hearing prosthesis is utilized to ultimately evoke a hearing percept.

Corollary to this is that while the embodiments detailed above have often been directed towards an integrated sound processing and signal augmentation system within the hearing prostheses, the signal augmentation can instead occur upstream of the standard signal processing path. This is something that could occur in the aforementioned system. In this regard, the signal that is provided to the hearing prosthesis could be an augmented signal where the "words" or sound that are/is provided to the sound processor of the hearing prostheses are already modified or otherwise augmented.

Modern televisions can have a variable and/or sometimes manually adjustable delay between picture and sound. This is generally to allow for the delay in processing the digital video image which is usually longer than the delay in processing the digital audio. The principle can be the same however. In fact, to be clear, some embodiments can be relatively "low tech." In some embodiments, a black box can be placed in between the television and the feed, which black box can have a memory and/or a delay circuit, and can delay the signal that is provided to the TV by a certain time, but also provide a signal to the hearing prostheses before providing the signal to the TV. By synchronizing the delay in the prosthesis with the delay in the black box, any deleterious effects associated with the delay associated with the sound could be mitigated. Still further, the black box can have the processing for the identification and/or word prediction, etc. In this example, the output from the black box would be output to the prosthesis at the same time as the video signal would be outputted to the television, because the delay associated with the utilitarian value of such is already used up with respect to the word identification before the signal reaches the hearing prosthesis. In this regard, the utilitarian value with respect to the delays as detailed herein occur outside of/before the signal is provided to the hearing prosthesis. Put another way, it is not the hearing prosthesis that operates with a delay (beyond that which is normal), but the system that is being used in conjunction with the hearing prosthesis.

Accordingly, embodiments include the introduction of a variable delay (up to many seconds, in some embodiments) between the received sound and the output signal of a hearing instrument where the amount of delay is adjusted, either manually or automatically, to suit different listening conditions.

Some embodiments include systems and devices and methods where the system recognizes different sound environments and identifies a utilitarian delay time automatically/based on predetermined regimes. By way of example, such identifications can include identification of broadcast audio (where relatively long delays can be acceptable), telephone conversations (where shorter delays are acceptable), face to face conversation (where less of a delay as possible tends to be best).

In some embodiments, the identification of these sound environments is through the user's own voice. If a voice (not the users) is detected and the user does not speak, in some embodiments, it is automatically determined that the user is listening to a broadcast signal, and the delay can be set accordingly. If another voice and the user's voice are speaking in turns, it can be automatically determined that it is likely that a conversation is occurring, and the delay is set accordingly. In this case, in some embodiments, latent variables or the like are used to determine if the conversation is over the phone or in person. Also, other detection features can be used, such as, for example, whether a telecoil or an external input is used, which are indicia of a telephone conversation, and thus the system can automatically determine such if these items are detected. In other scenarios, the quality of the phone signal (e.g., is the bandwidth limited or broad, or other spectral characteristics can be evaluated, etc.) may also identify the conversation as an over the telephone conversation as opposed to an in-person telephone conversation. In an exemplary implementation, the user can have the ability to override the automated detection via a user entered command or the like.

Corollary to the above is that in some embodiments, the type of conversation can be inputted into the prestigious or other system via the recipient. In an exemplary embodiment, the prosthesis can be provided with input systems, such as buttons, where the recipient can press a button to indicate the type of conversation. That is, the recipient can affirmatively input information into the prostheses to indicate the type of conversation. In some embodiments, the input can be voice input. For example, because the hearing prosthesis includes a microphone and can capture the voice of the recipient, in some embodiments, all the recipient does is state a predetermined pre-set phrase of the like that the prostheses can interpret as input information, where the prosthesis is configured to recognize that that is input as opposed to simply a statement made in a conversation or the like. Any device, system, and/or method that can provide the hearing prosthesis or other system information with respect to the type of conversation so that the system can determine the type of delay that should be implemented can be utilized in at least some exemplary embodiments.

Figure 5:
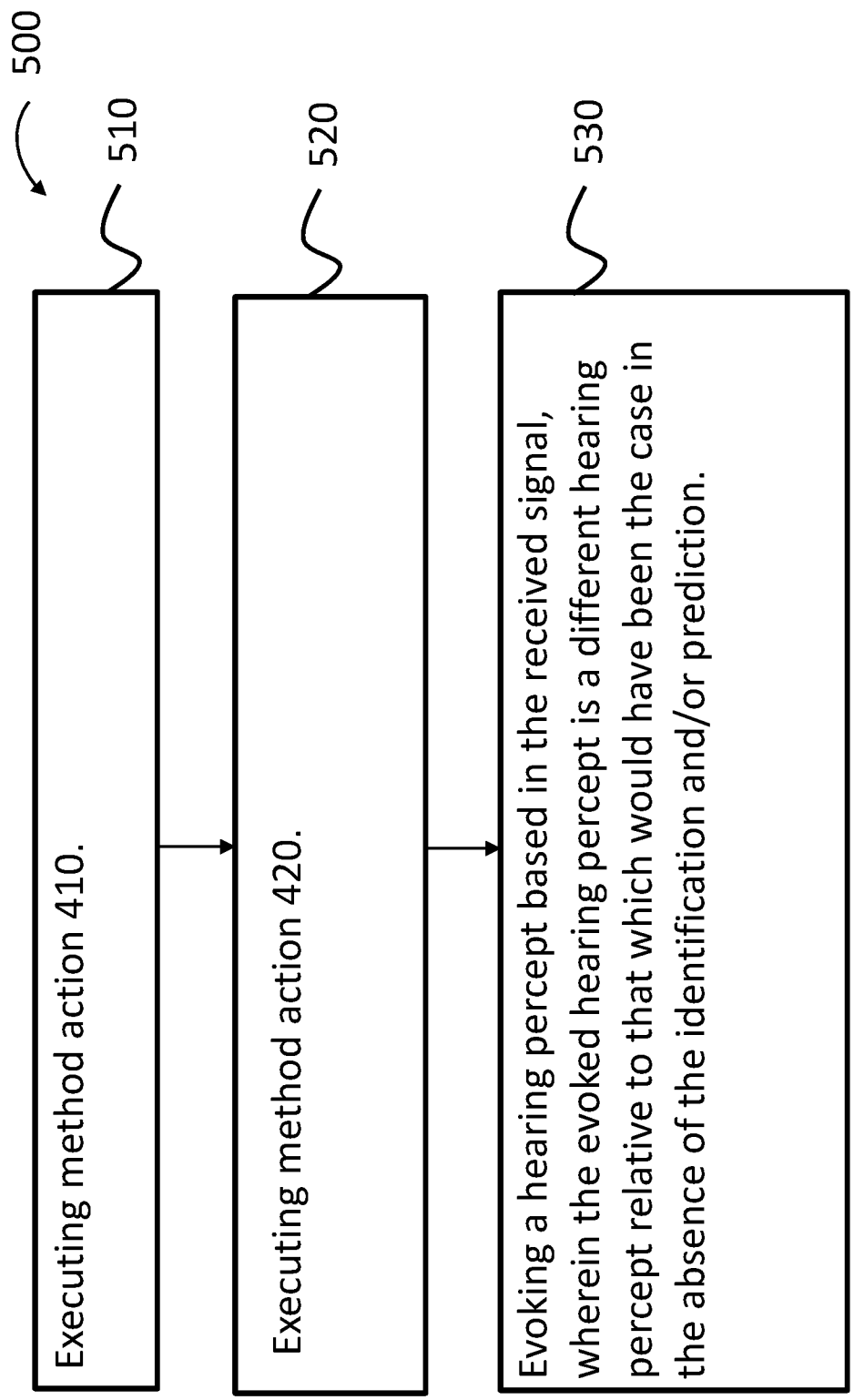

FIG. 5 presents an exemplary algorithm for an exemplary method, method 500, which includes method actions 510 and 520, which respectively include executing method actions 410 and 420 detailed above. Method 500 also includes method action 530 which includes evoking a hearing percept based in the received signal, wherein the evoked hearing percept is a different hearing percept relative to that which would have been the case in the absence of the identification. Here, this method may be, in some instances, implemented by simply only utilizing noise cancellation or noise suppression techniques or even beamforming techniques for that matter. Anything that will result in a modified or different hearing percept relative to that which would have been the case in the absence of the identification and/or production can be utilized in at least some embodiments.

With reference to FIG. 5 and the method 500, and the embodiments above detailing how video can be related to more of a delay than conversation in person speech, an exemplary embodiment includes executing method 500 (or method 400, in some embodiments, or any other method detailed herein), where the processing is correlated to a noticeable delay in the hearing prosthesis noticeable by the person in which the hearing percept is evoked relative to that which would be the case in the absence of the processing. The method further comprises evaluating an overall context related to the received signal, determining one or more parameters for a delay that will result in the noticeable delay, and adjusting a processing regime used by the system so that the noticeable delay falls within the one or more parameters. For example, more extensive word recognition or word prediction algorithms can be used relative to others, such as if there will be a longer delay. Moreover, more "fail safe" checks can be run to check to see if the predictions/identifications are accurate, and if not, run another prediction/identification. For example, if the predicted or identified word is run, and there is limited time for the delay, it may not be possible to completely determine that the word is spoken in the context where the word would be recognized as "fun" instead of "run." However, if more time is available, more context could be provided. In an extreme example, if the conversation pertains to someone with a broken leg, the method could determine that it is unlikely that the word is "run." Of course, this could take a more extensive amount of data to ascertain this, and hence a larger delay. That said, in an exemplary embodiment, such as one that relies on artificial intelligence or otherwise utilizes very powerful processing, the system or method could identify an overall context of the speech and extrapolate that it is unlikely that someone is talking about running because of statements that were made well before the worded issue (such as I have not been able to leave the house for days because I am sick, followed by minutes of discussion about the stock market—the system could interpret it to be unlikely that the word run would be uttered by the person who is sick, etc.).

In an exemplary embodiment, the one or more parameters include a length of the delay and the length of the delay is longer for video-based speech data than for real time speech data from a person speaking to a recipient of a hearing prosthesis that is used to evoke the hearing percept.

Figure 6:
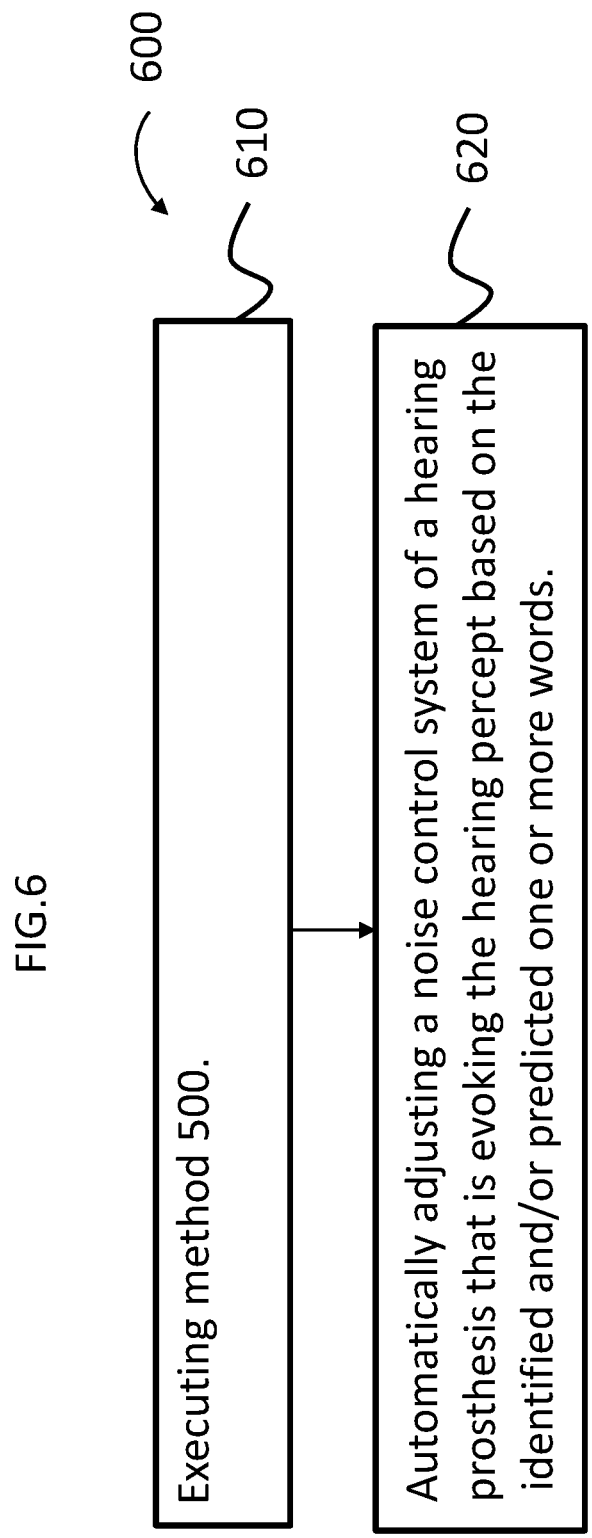

FIG. 6 presents an exemplary flowchart for an exemplary method, that 600, which includes method action 610, which includes executing method 500. Method 600 further includes method action 620 which includes automatically adjusting a noise control system of a hearing prosthesis that is evoking the hearing percept based on the identified and/or predicted one or more words. By way of example only and not by way of limitation, this can be an adjustment to a noise cancellation system. In an exemplary embodiment, this can be an adjustment to a beamforming system or the like so that the microphones of the prosthesis focus towards a speaker as opposed to a more omnidirectional focusing which would capture more noise.

Whether and to what extent adjustments are made to the operation of the prosthesis and/or modifications to words/signals, replacement of words/signals based on the word identification/prediction techniques can, in some embodiment, depend on a level of certainty for of the word prediction/identification. For example, if the level of certainty is low (which might happen when insufficient data is available to predict the next word, or if there are variables that indicate that the identified word may not be correct/the percentage chance that the word is correct), these techniques may not adjust the device much, if at all. In such instances, the device should operate according to standard practice, such as, for example, implementing noise cancellation according to the traditional algorithm, or implementing beamforming according to the algorithm that is not based on word identification/prediction. In some embodiments, the operation of the hearing prosthesis can reflect a combination of standard techniques which are influenced/controlled in some part, based on the teachings herein. For instance, the word recognition and/or word prediction techniques can be used to enable very aggressive levels of noise reduction techniques with fewer artefacts, such as in a scenario where there is high confidence of the prediction/identification, as opposed to the opposite, where there would be normal operation of the noise reduction system. In such embodiments, a correlation between the predicted word and an outcome of an aggressive adjustment can enable use of that outcome, rather than a less aggressive adjustment, without the introduction of unwanted artefacts. Indeed, in this regard, the substitution/replacement/change in the signal and/or some of the other teachings herein can be considered an extreme form of noise cancellation/noise reduction, in the sense that, for example, if the signal is completely replaced with an artificial signal, the new signal can be devoid of noise/can be a signal that contains only what is wanted (which could be nothing but speech, in some embodiments).

In some embodiments, for a system implementing sufficient delay to extend to the syllable, word or sequence of words being predicted, it is possible to measure the accuracy of the prediction. This can be done by way of example by comparing the predicted syllable, word or sequence or words with the actual syllable, word or sequence of words being predicted, both of which are available at any instant in a system with such delay. Further, for example, for a system without sufficient delay to extend to the syllable, word or sequence of sequence of words being predicted at the time the system can determine the accuracy of prediction by monitoring the actual syllable, word or sequence of words that is uttered after the prediction is made. In some embodiments, in both cases mentioned above, if the correlation between predicted the predicted and actual utterances is high, then the system will be more likely to replace actual utterances with the predicted utterances. In some embodiments, other factors, in addition to the accuracy of prediction measure, may used in deciding when and how to replace an utterance with a predicted substitute utterance. An example of one of these factors to be taken into account is the speech perception ability of the listener or recipient of the hearing instrument. In cases where the speech perception ability of the recipient is poor the system will increase the likelihood that it will replace all or part of a syllable, word or sequence of words because the recipient is less likely to be able to understand the incoming speech without assistance. Conversely, in cases where the speech perception ability of the recipient is good, the system will be less likely to replace all or part of a syllable, word or sequence of words because the recipient is more likely to comprehend the incoming speech without adjustment from the system. Another example of an input that may be taken into account in determine the likelihood of replacing actual utterances with predicted ones is a "real time" estimate of how well the user is comprehending a particular incoming speech train. For example, if the user is listening to a pod cast, video broadcast or similar an estimate of this may be made by monitoring the number of times the user replays or repeats a particular sequence of the podcast, video broadcast or similar. If however the user is detected as being in conversation with another person, for example over the telephone or in person, an estimate of the user's level of difficulty with the conversation may be obtained by the number of times he or she asks the speaker to repeat him or herself. Another way of determining the difficulty level is by monitoring how many times the user adjusts the controls of the shearing instrument. If the user adjusts the controls multiple times it will be appreciated that the user is more likely to be having difficulty in understanding the incoming speech compared to if he or she adjusts the hearing instrument fewer times. In some instances, there are other variables that impact of the likelihood of the system replacing or not replacing a particular syllable, word or sequence of words such as the accent of the speaker being listened to, the level of reverberation in the incoming sound, the frequency spectrum of the incoming sound to name but a few. It will also be appreciated that the likelihood of replacing a particular utterance with a predicted one may be dynamic in that some or all of the above mentioned and other variables impacting on that likelihood are likely to vary with time. As these variables change, so too will the aforementioned likelihood of replacing a syllable, word or sequence or words. The speed with which the said likelihood responds to changes in the aforementioned variables is another parameter which may be controlled by the system implementing the replacement of the syllable, word or sequence of words. Embodiments include devices, systems and/or methods that can detect one or more or all of the aforementioned occurrences, and evaluate the detected data to make a judgment as to whether to implement one or more of the teachings herein and then to do so or instruct another system/control another system to do so.

Also, in some embodiments, there is an action of automatically adjusting a volume and/or a gain of a hearing prosthesis that is evoking the hearing percept based on the identified and/or predicted one or more words. This instead of or in addition to the above noted adjustments/operations.

In an exemplary embodiment, the signal is modified to produce a word that is a different word than that which would have likely been perceived by the recipient relative to that which would have been the case in the absence of the modification or a new signal is produced that is provided to a device that evokes the hearing percept, which new signal results in the production of a word that is a different word than that which would have likely been perceived by the recipient relative to that which would have been the case if the signal was used by the device.

Further, in an exemplary embodiment, the signal is modified to produce a meaning that is a different than that which would have likely been comprehended by the recipient relative to that which would have been the case in the absence of the modification or a new signal is produced that is provided to a device that evokes the hearing percept, which new signal produces a meaning that is a different from that which would have likely been comprehended by the recipient relative to that which would have been the case if the signal was used by the device. This scenario is a rather "extreme" (in a good way) example of the powers of innovations herein. Here, the recipient is provided with something that would not have been the case. Note that this not word translation, where the comprehension would be the same providing that the person understood the language. This results in a fundamental different result that is the highest level of hearing—to comprehend.

Consistent with the teachings above, in an exemplary embodiment of the methods above, the hearing prosthesis is configured to evoke a hearing percept such that a hybrid word is provided to the recipient based on the results of the identification. In this regard, by way of example only and not by way of limitation, if the word identification and/or word prediction system does not have a sufficiently level of high confidence that the word identified and/or predicted is correct, and/or if there are two or more "competing" words that could be applicable, depending on the circumstances, a combination of the words could be created or a hybrid word could be provided where the recipient would hear a word that could be interpreted as both (or would not lead the recipient one way or another based on human factors engineering statistics and/or psychoanalysis data) but in the context would be understood. For example, the precedent word "North" or "South" before the word Carolina might be "mouth," as in "Mouth Carolina." The recipient might not know which is which, but at least the recipient would not be led the wrong way. Indeed, it is entirely possible it does not matter which one it is. However, this guards against false information being provided to the recipient. Alternatively, because the discussion might be in regard to a trip to "Myrtle Beach," the recipient will understand that it is with reference to South Carolina. That said, it is possible utilizing the advanced systems where the system could understand that it should be South Carolina because of the context. This demonstrates the power of the innovations herein.

Thus, in an exemplary embodiment, in view of the above, the hearing prosthesis (or other part of the system) can be configured to evaluate a level of certainty of the identification and generate a hearing percept based on the evaluation of the level of certainty, wherein the generated hearing percept is different depending on the level of certainty.

In an exemplary embodiment, of method 500, for example, the signal is modified to produce a completely different sound relative to that which would have been the case in the absence of the modification and/or a new signal is produced that is provided to a device that evokes the hearing percept, which new signal results in the evocation of a completely different sound relative to that which would have been the case if the signal was used by the device. In some embodiments, the action of identifying and/or predicting one or more words in the speech data includes identifying one or more sentences in the speech data and there is no noticeable delay by the person in which the hearing percept is evoked. In some embodiments, the action of identifying and/or predicting one or more words in the speech data includes identifying one or more sentences in the speech data and the delay that is present, if any, is any one of the delays noted above.

In view of the above, it can be seen that in some embodiments, there is a hearing prosthesis (as opposed to a hearing prosthesis system, which might include the smart phone or a remote device in signal communication therewith) including a sound capture device and a processing system, wherein the hearing prosthesis is configured to convert sound captured by the system, such as, for example, by the hearing prosthesis, and process a signal based on the captured sound with the processing system and evoke a hearing percept based on output from the processing system based on the signal. In this exemplary embodiment, the hearing prosthesis is part of a system that includes a sound prediction and/or word identification functionality such that the device is configured to predict sound that is captured by the sound capture device. Here, that can be part of the hearing prosthesis, or be part of another device, such as a smart phone, that is in communication with the prosthesis. Note that in this embodiment, there is the prediction of sound, as opposed to the prediction of words.

In an exemplary embodiment, all of the functionality can be located within or otherwise as part of the prosthesis, while in other embodiments, the functionalities are separated throughout the system. Indeed, in an exemplary embodiment, the system is the hearing prosthesis, which means that the system does not include other components, such as the smart phone or a remote processor, to have the functionality.

In an exemplary embodiment, the system has the sound prediction functionality which is a word prediction functionality, and, in some embodiments, it is the hearing prosthesis that has the sound prediction functionality. In other embodiments, the sound prediction functionality is located in another device, such as the smart phone, such as a computer that is in communication with the hearing prosthesis via remote server. Moreover, in an exemplary embodiment, the functionality can be located in the above-noted black box that is integrated into the communication system.

In an exemplary embodiment, the system is configured to evoke a hearing percept based on a result of the word prediction functionality that is different from that which would be the case in the absence of the result. This is consistent with the teachings above. In an exemplary embodiment, the sound prediction functionality is a word prediction functionality, and the system has such, and wherein the word prediction functionality is the ability to predict a word after one or more next words that have yet to be received by the processing system. As detailed above, the one or more next words, can be 1, 2, 3, 4, 5, 6, 7, 8, 9, 10, 11, 12, 13, 14 or 15 next words or any value or range of values therebetween in one increment, providing that the art enable such. In an exemplary embodiment, the prosthesis is configured to increase an aggressiveness of a noise reduction algorithm based on prediction of sound. In an exemplary embodiment, the prosthesis is configured to decrease in aggressiveness/increase a regressiveness of a noise reduction algorithm based on the prediction of sound (as noted above, in some embodiments, the systems and teachings herein can be considered noise reduction). In an exemplary embodiment, these are done based on the protections of words.

Briefly, consistent with the teachings above, in an exemplary embodiment, the system of which the hearing prosthesis is a part (e.g., the prosthesis itself), can be configured to introduce a variable delay (whether such is automatic/developed by the system, or based on input by the user) between sound capture and the evocation of the hearing percept, and the system is configured to use the prediction functionality to predict words and then compare the predicted word to what is then received and then adjust the operation of the system, such as adjusting the operation of the hearing prosthesis, to evoke a hearing percept based on this comparison. Also, the system can be configured to introduce a delay between the temporal locations of the sound capture and the evocation of the hearing percept that is delta to the normal processing delay and the system is configured to identify a sound environment, and vary the delay based on the identified sound environment. In an exemplary embodiment, the prosthesis or other part of the system is configured with a scene classifier, such as that disclosed in US Patent Application publication No. 2017-0359659, entitled Advanced Scene Classification for Prosthesis, published Dec. 14, 2017, naming Von Brasch as an inventor, and/or can be a device/system that corresponds to that disclosed in that application/the prostheses and systems herein can correspond to that device/system with the additional functionalities herein/as modified herein. The devices and systems can also have an own voice detector, that can be used to determine the environment. In an exemplary embodiment, own voice detection is executed according to any one or more of the teachings of U.S. Patent No. 2016/0080878 and/or the implementation of the teachings associated with the detection of own voice herein are executed in a manner that triggers the control techniques of that application. Accordingly, in at least some exemplary embodiments, the prosthesis 100 and/or the device 240 and/or the remote device are configured to or otherwise include structure to execute one or more or all of the actions detailed in that patent application. Moreover, embodiments include executing methods that correspond to the execution of one or more the method actions detailed in that patent application.

In an exemplary embodiment, own voice detection is executed according to any one or more of the teachings of WO 2015/132692 and/or the implementation of the teachings associated with the detection of the invoice herein are executed in a manner that triggers the control techniques of that application. Accordingly, in at least some exemplary embodiments, the prosthesis 100 and/or the device 240 and/or the remote device are configured to or otherwise include structure to execute one or more or all of the actions detailed in that patent application. Moreover, embodiments include executing methods that correspond to the execution of one or more the method actions detailed in that patent application.

Also as noted above, the devices can use latent variables, or other arrangements, such as a telecoil detector, etc.

Figure 7:
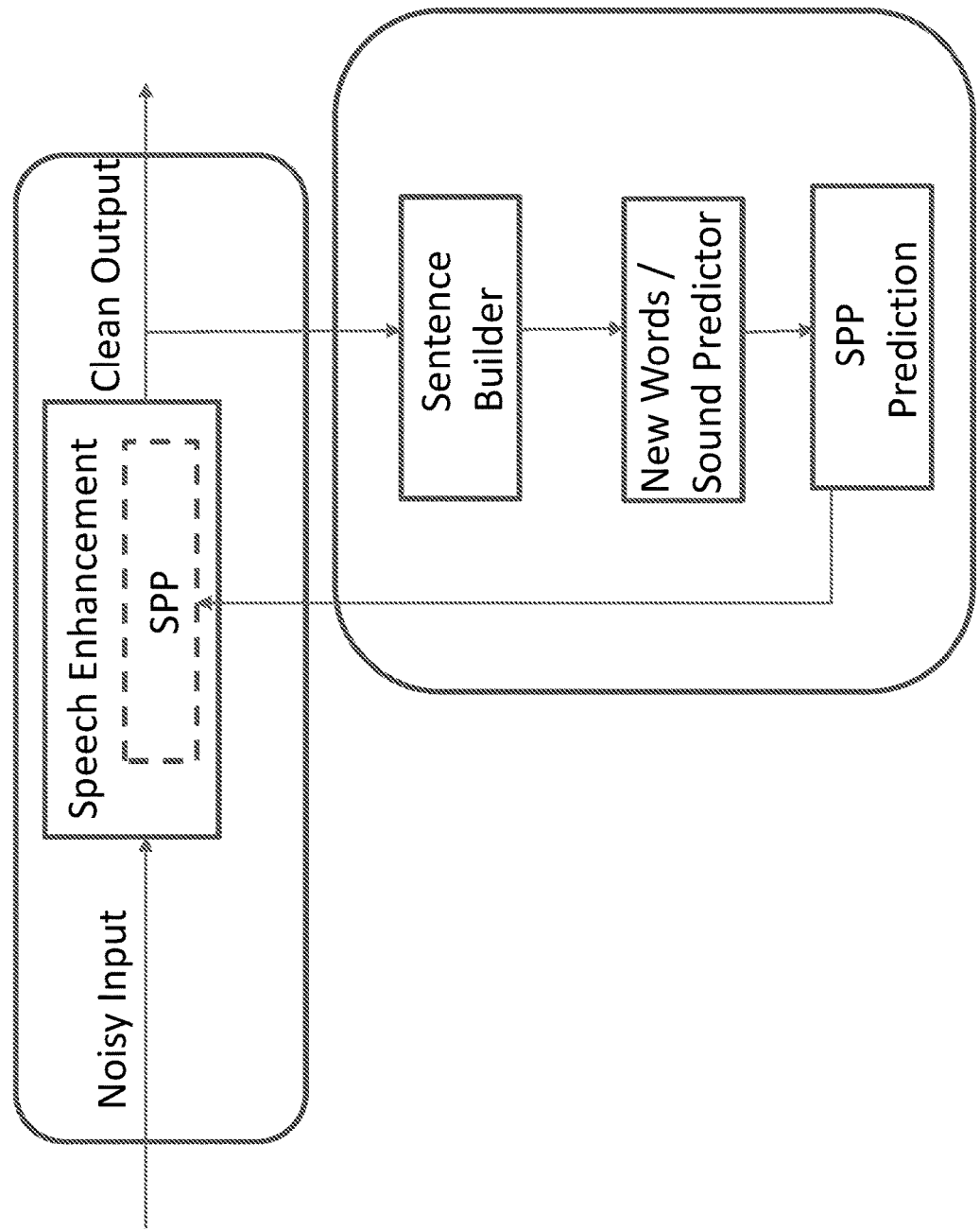
FIG. 7 presents a functional block diagram of an exemplary embodiment.

Some embodiments include speech enhancement algorithms and devices that include a component that is referred to in the art a speech presence probability (SPP) estimator. FIG. 7 provides an exemplary embodiment where such is used with the teachings herein. Here, there can be improvement on speech enhancement strategies via obtaining an accurate SPP. Any commercially available speech presence probability estimator can be utilized in the embodiments herein when combined with the teachings herein. The SPP estimator can be based in a processor or a computer or the like and/or be based on a chip and/or can be based in an artificial intelligence system that is part of the hearing prostheses or part of a separate component of an overall system of which the hearing prostheses is a part. In an exemplary embodiment, predicting the next word or words or sentences, etc., is utilized for speech enhancement. For example, one implementation includes the utilization of the prediction to enhance the estimation of the SPP relative to that which would otherwise be the case in the absence of predictions. The predicted words/sounds can be used to generate a separate SPP and/or to modify the existing SPP, which could be combined with the traditional SPP of the speech enhancement algorithm, providing that such enhances the operation thereof.

FIG. 7 provides a block diagram of an exemplary embodiment utilizing the teachings just detailed. In FIG. 7, block 700 can correspond to or otherwise can be analogous to the signal augmentation block of FIG. 3. Block 720 can correspond to or otherwise be analogous to the block marked "signal recognition and analysis" of FIG. 3." There are of course other ways to implement this, and any device system and/or method that can enable the teachings detailed herein can be utilized in at least some exemplary embodiments.

In some embodiments, the above embodiment emphasizes the "prediction" of the next word or sentence, or the next after the next word, etc. In the case where delay is available, this may be counterintuitive, because the next word or sentence is already uttered and known and does not need to be "predicted." However, the prediction of the ideal or perfect word (e.g., without interfering noise or spoken in a clear accent) in reality may not be what is actually received. Therefore, if the ideal word or sentence is correctly predicted, the characteristics of this word can be superimposed on the actual utterance to whatever degree is utilitarian, in some embodiments.

Thus, in an exemplary embodiment, the system includes a speech presence probability estimator, embodied in the processor of the hearing prosthesis, based on software or an artificial intelligence component (chip, processor) or a trained expert system, etc., and/or embodied away from the prosthesis, such as in the smartphone, or a remote device. Further, the system is configured to use the sound prediction functionality (e.g., the word prediction functionality, which includes a sentence prediction functionality and a phrase prediction functionality) to enhance functionality of the speech presence probability estimator.

Figure 8:
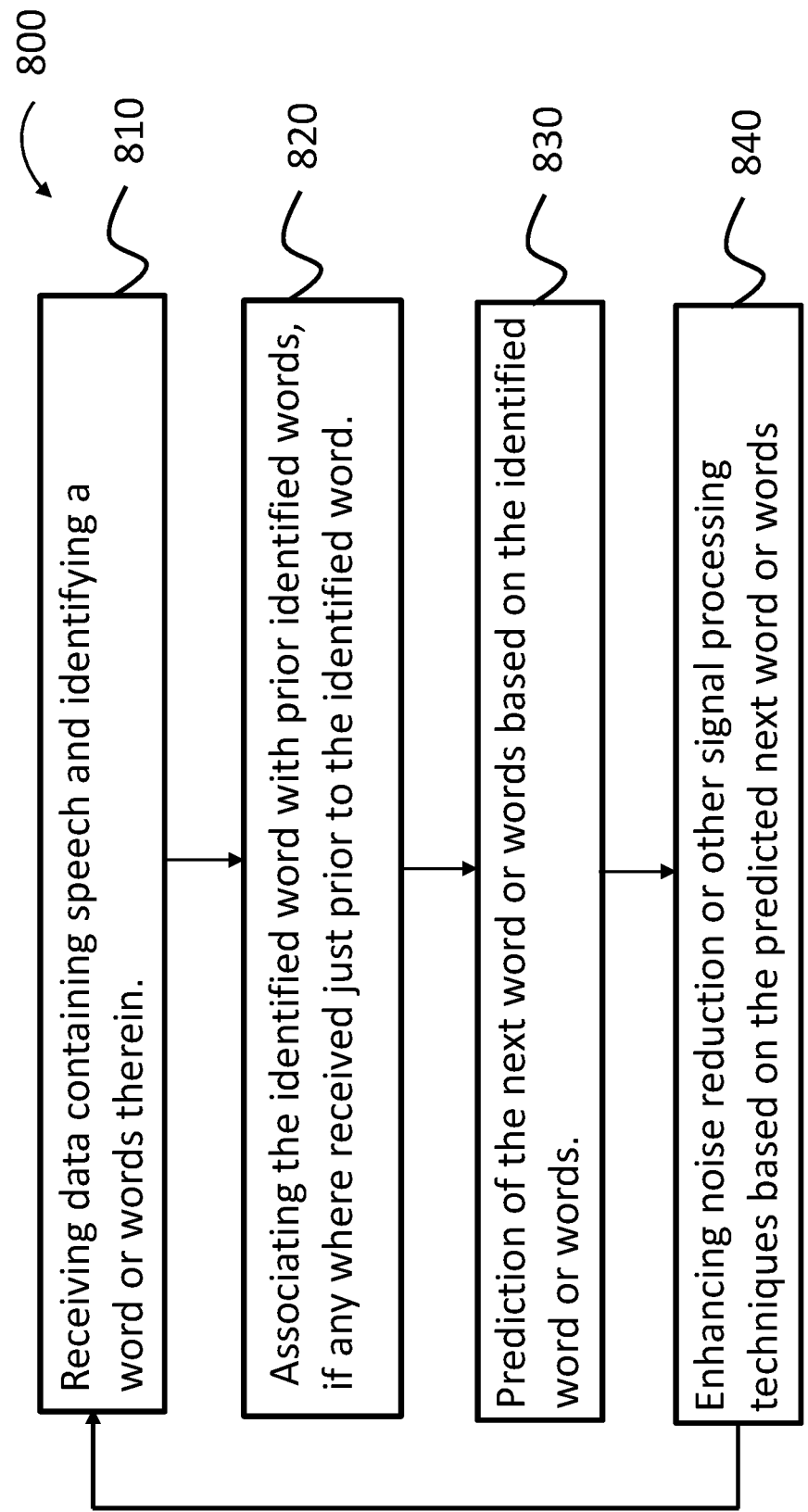
FIG. 8 presents exemplary flowcharts for exemplary methods.

FIG. 8 presents another exemplary flowchart for an exemplary method, method 800. Method 800 includes method action 810, which includes receiving data containing speech and identifying a word or words therein. Method 800 further includes method action 820, which includes associating the identified word with prior identified words, if any where received just prior to the identified word. Method action 830, which is also part of method 800, includes the prediction of the next word or words based on the identified word or words. Method 800 also includes method action 840, which includes enhancing noise reduction or other signal processing techniques based on the predicted next word or words. The method actions 810 to 840 are repeated for as long as method 800 is desired to be utilized. In this regard, in an exemplary embodiment, the systems and devices and prostheses detailed herein can be configured to automatically engage and/or disengage the prediction/identification functionalities and the associated control features/signal manipulation/signal manufacturing therewith.

Embodiments include hearing prostheses sound processor components (the BTE device/an off the ear (OTE) device) that apply intelligence to assist with speech recognition/speech prediction. This is not simply classification of incoming sound—this is the concept of attempting to actually understand the incoming speech. Embodiments can utilize the underlying features of current word and/or sound prediction and/or word identification on a behind the ear or in the ear hearing instrument and/or in the OTE instrument.

In some embodiments, once a word or words or sentences, etc. is recognized, the hearing instrument can then have complete control over how that sentence is delivered to the listener. It can be presented in a noise free, easy to comprehend manner, providing that such is utilitarian.

Indeed, embodiments can include providing speech hearing percept that is based on a completely synthesized signal. This is not simply complete noise removal. This is the creation of a completely new "sound" relative to that which was captured that happen to include the speech. The teachings detailed herein are utilized to enable such in at least some embodiments.

The teachings detailed herein can have utilitarian value with respect to improving the speech perception abilities of people who currently have poor speech understanding. This can be because they are likely to respond best to a simplified presentation of sound—something that can be achieved if the meaning of the original speech is understood but is difficult to do without that knowledge. A significant proportion of cochlear implant recipients fall into this category for reasons that are not well understood at the current time. The teachings detailed herein can be utilized to aid such people.

Modern mobile phones and communication apps such as Skype use a real time voice coding technology that tracks voice pitch and formants—parameters that vary relatively slowly in speech. They then reconstruct the speech at the receiving end. Embodiments can utilize this technology to achieve the above-noted features, but it is noted that this does not attempt to recognize the words spoken.

At least some exemplary embodiments leverage the length of an acceptable delay (or a tolerable delay) in a particular listening situation to improve speech understanding, in some instances dramatically, especially with cochlear implant devices.

In an exemplary embodiment, all other things being equal, the utilization of the word prediction and/or word recognition and/or sound prediction techniques detailed herein can enable, on a standardized hearing test for a cochlear implant recipient that is recognized as having utilitarian value by Cochlear Limited as of Apr. 26, 2019, an improvement of at least 10, 15, 20, 25, 30, 35, 40, 45, 50, 55, 60, 65, 70, 75, 80, 85, 90, 95, 100, 110, 120, 130, 140, 150, 175, 200, 250, 300, 350, 400, 450, 500, 600, 700, 800, 900, or 1000 percent or more, or any value or range of values therebetween in 1% increments relative to that which would be the case if the hearing prosthesis was utilized without the predictive/identification techniques detailed herein, all other things being equal.

It should be noted that in cases where speech has been recognized it can be possible in some instances to improve perception in a graduated manner. In cases where a user has very poor speech perception—for example for some cochlear implant recipients—it may be utilitarian to provide output to the user in a clear voice that bears little resemblance to that of the original speaker. And the teachings detailed herein enable such. The hearing instrument can provide, in some embodiments, some cues taken from the original speech input, such as, for example, voice pitch, and reconstruct the speech from, for example, existing libraries of sounds which are matched to the needs and speech recognition abilities of the user. For users with good speech perception, most of the qualities of the original speech may be retained and transmitted to the user. Knowledge gained from speech recognition can be used to "clean up" the speech, for example by removing background noise in the signal or making consonants more distinct or making formant transitions (which distinguish vowel sounds) more pronounced. The resulting speech output can then be based on features of the original speaker's voice with or without embellishments, such as, for example, provided by the built-in intelligence of the software running on the hearing instrument, or by a remote device. The degree of embellishment will be matched to the needs of the user and may vary, depending on the noise level or likely difficulty that the user will have in recognizing the speech. Further, there exists the embodiment of assessing the likely intelligibility of the incoming speech to the user and changing the processing strategy to be most appropriate for that level of intelligibility. This can involve changing the extent or proportion of the original speech conveyed to the user compared to the extent or proportion of computer-generated speech which is known to be intelligible to the user, in some embodiments.

Embodiments include reducing ambient sound to nothing more than speech. Embodiments also include providing a hearing's percept that is totally synthesized and bears little if any resemblance to the actual speech in the ambient environment. By way of example only and not by way of limitation, some people may have voice frequencies or voice speech patterns or peculiar speaking features that make it difficult for a cochlear implant recipient to hear. Embodiments include developing a data set that is used by the hearing prostheses that evoke a hearing percept that has little if any resemblance to the speaker's voice, providing that it provides or otherwise enables the recipient to better comprehend the speech. Accordingly, at least some exemplary embodiments provide a hearing prosthesis that provides the singular function of conveying speech to a recipient at a most basic level or a more basic level relative to that which would otherwise be the case in the absence of the teachings. The prosthesis in some embodiments is reduced to nothing more than a communication device, at least during the temporal periods where the device is utilized accordingly. While the embodiments above sometimes focus on completely developing a new signal, it is noted that this may not necessarily be the case in all instances, signal enhancement using intelligent sound and speech recognition could be utilized in various manners. Some of which are to completely synthesize new speech, while in other embodiments are to modify a given signal. Granted, the end results may not be noticeably different the recipient. It is simply noted that both ways, or any other way for that matter, are covered according to the teachings detailed herein providing that such can enable the goals and teachings herein.

Embodiments include tailoring the systems to operate according to specific needs and/or specific people. As will be readily understood from the above, the innovative teachings herein can be (are) merged with the existing sound stream components and methods to achieve something that the recipient otherwise would hear. Sound and/or speech recognizers can be configured to output a computer-generated version of the sounds they recognize.

Embodiments can include ascertaining the level of performance of a given recipient with respect to the hearing prosthesis. For poor performers, the teachings detailed herein can be utilized in a very aggressive format so as to focus almost entirely if not entirely on speech comprehension. For better performers, a less aggressive approach can be taken where more subtle changes or modifications or replications are made vis-à-vis the ultimate hearing percept. Indeed, in some embodiments, the teachings detailed herein can be combined with on board training systems and/or data loggers and/or data analysis devices that can ascertain the level of proficiency of a hearing prosthesis recipient, at least in a general enough manner to influence the operation of the systems herein. Alternatively, the devices, systems, and methods herein can be set by healthcare professional or the like, and otherwise adjusted based on the analysis of that healthcare professional as to the proficiency of a given recipient.

Embodiments can balance the added delay against significant interference with the user's experience. Such can be enabled by permitting the recipient to have some and/or control over the delay. For example, embodiments can include an arrangement where the system implements a delay chosen by the system, in the recipient provides input as to whether or not the delay is acceptable or unacceptable, and the system can iterate or otherwise revise the delays until a balance is achieved.

In some exemplary embodiments, the processing delay is always at least more than 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65 or 70 milliseconds or any value or range of values therebetween in 1 ms increments when the recognition and/or prediction techniques are being implemented. This is of course and only some embodiments, and not all embodiments.

Figure 9:
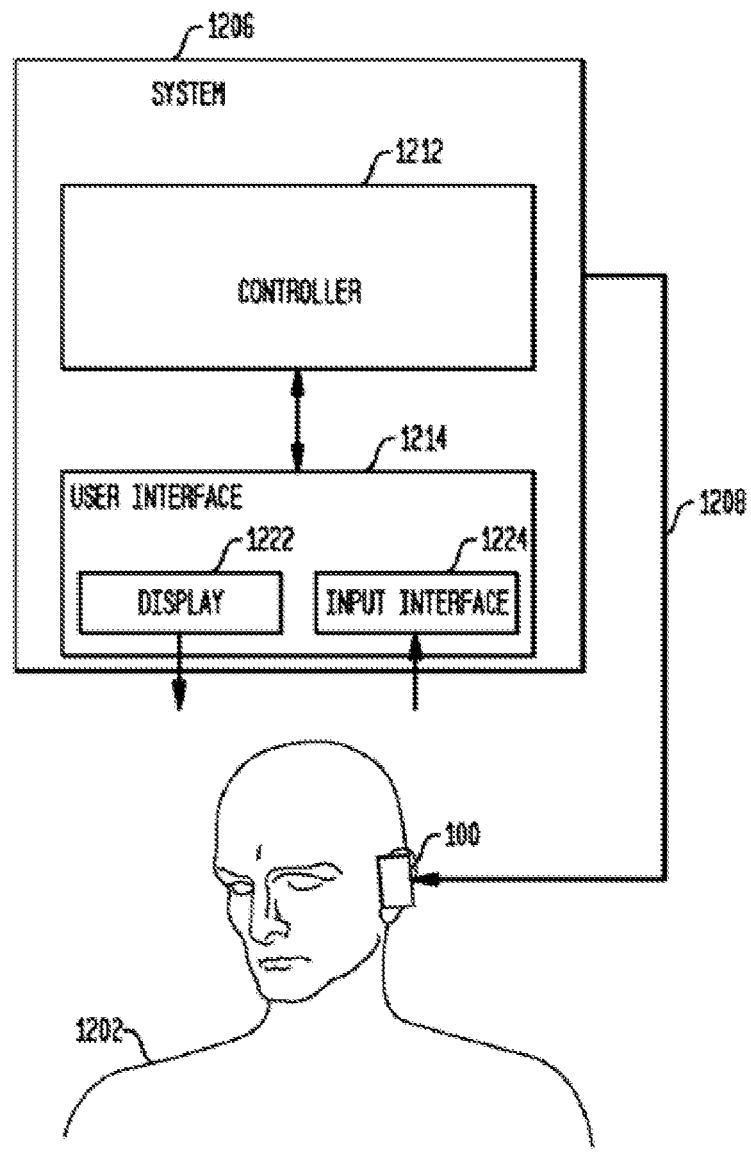
FIG. 9 presents an exemplary functional schematic of an exemplary system according to an exemplary embodiment.

FIG. 9 presents a functional schematic of a system with which some of the teachings detailed herein and/or variations thereof can be implemented. In this regard, FIG. 9 is a schematic diagram illustrating one exemplary arrangement in which a system 1206 can be used to execute one or more or all of the method actions detailed herein in conjunction with the use of a hearing prosthesis 100. System 1206 will be described, at least in part, in terms of interaction with a recipient. In an exemplary embodiment, system 1206 is a recipient-controlled system. In an exemplary embodiment, system 1206 can correspond to the remote device 240, which, as detailed above, can be a portable handheld device, and/or can be a personal computer, etc. It is also noted that system 106 can correspond to any of the systems detailed herein, or any of the processing systems herein.

In an exemplary embodiment, system 1206 can be a system having additional functionality according to the method actions detailed herein. In the embodiment illustrated in FIG. 9, the hearing prosthesis 100 can be connected to system 1206 to establish a data communication link 1208 between the hearing prosthesis 100 and system 1206. System 1206 is thereafter bi-directionally coupled by a data communication link 1208 with hearing prosthesis 100. Any communications link that will enable the teachings detailed herein that will communicably couple the implant and system can be utilized in at least some embodiments.

System 1206 can comprise a system controller 1212 as well as a user interface 1214. Controller 1212 can be any type of device capable of executing instructions such as, for example, a general or special purpose computer, a handheld computer (e.g., personal digital assistant (PDA)), digital electronic circuitry, integrated circuitry, specially designed ASICs (application specific integrated circuits), firmware, software, and/or combinations thereof (note any of the functional components/functionalities detailed herein can be implemented in any of these devices if such enables the teachings, such as by providing such with programming stored in on-board memories—controller 1212 can execute some or all of the method actions herein, if it is provided with the programming and the hardware and/or firm ware, or otherwise provided with utilitarian circuitry. As will be detailed below, in an exemplary embodiment, controller 1212 is a processor. Controller 1212 can further comprise an interface for establishing the data communications link 1208 with the hearing prosthesis 100. In embodiments in which controller 1212 comprises a computer, this interface may be, for example, internal or external to the computer. For example, in an exemplary embodiment, controller 1206 and cochlear implant may each comprise a USB, Firewire, Bluetooth, Wi-Fi, or other communications interface through which data communications link 1208 may be established. Controller 1212 can further comprise a storage device for use in storing information. This storage device can be, for example, volatile or non-volatile storage, such as, for example, random access memory, solid state storage, magnetic storage, holographic storage, etc.

User interface 1214 can comprise a display 1222 and an input interface 1224 (which, in the case of a touchscreen of the portable device, can be the same). Display 1222 can be, for example, any type of display device, such as, for example, those commonly used with computer systems. In an exemplary embodiment, element 1222 corresponds to a device configured to visually display a plurality of words to the recipient 1202 (which includes sentences), as detailed above.

The system of page 9 can be used in the embodiments where not all of the functions executed are executed by the prosthesis. The system 1206 can be the smart phone, in some embodiments.

Input interface 1224 can be any type of interface capable of receiving information from a recipient, such as, for example, a computer keyboard, mouse, voice-responsive software, touch-screen (e.g., integrated with display 1222), microphone (e.g. optionally coupled with voice recognition software or the like) retinal control, joystick, and any other data entry or data presentation formats now or later developed. It can be the touch screen of the smart phone. It is noted that in an exemplary embodiment, display 1222 and input interface 1224 can be the same component, e.g., in the case of a touch screen). In an exemplary embodiment, input interface 1224 is a device configured to receive input from the recipient indicative of a choice of one or more of the plurality of words presented by display 1222.

It is noted that in at least some exemplary embodiments, the system 1206 is configured to execute one or more or all of the method actions detailed herein, where the various sub-components of the system 1206 are utilized in their traditional manner relative to the given method actions detailed herein.

In an exemplary embodiment, the system 1206, detailed above, can execute one or more or all of the actions detailed herein and/or variations thereof automatically, at least those that do not require the actions of a recipient.

In this vein, it is again noted that the schematic of FIG. 9 is functional. In some embodiments, a system 1206 is a self-contained device (e.g., a laptop computer, a smart phone, etc.) that is configured to execute one or more or all of the method actions detailed herein and/or variations thereof. In an alternative embodiment, system 1206 is a system having components located at various geographical locations. By way of example only and not by way of limitation, user interface 1214 can be located with the recipient (e.g., it can be the portable handheld device 240) and the system controller (e.g., processor) 1212 can be located remote from the recipient. By way of example only and not by way of limitation, the system controller 1212 can communicate with the user interface 1214, and thus the portable handheld device 240, via the Internet and/or via cellular communication technology or the like. Indeed, in at least some embodiments, the system controller 1212 can also communicate with the user interface 1214 via the Internet and/or via cellular communication or the like. Again, in an exemplary embodiment, the user interface 1214 can be a portable communications device, such as, by way of example only and not by way of limitation, a cell phone and/or a so-called smart phone. Indeed, user interface 1214 can be utilized as part of a laptop computer or the like. Any arrangement that can enable system 1206 to be practiced and/or that can enable a system that can enable the teachings detailed herein and/or variations thereof to be practiced can be utilized in at least some embodiments.

Figure 10:
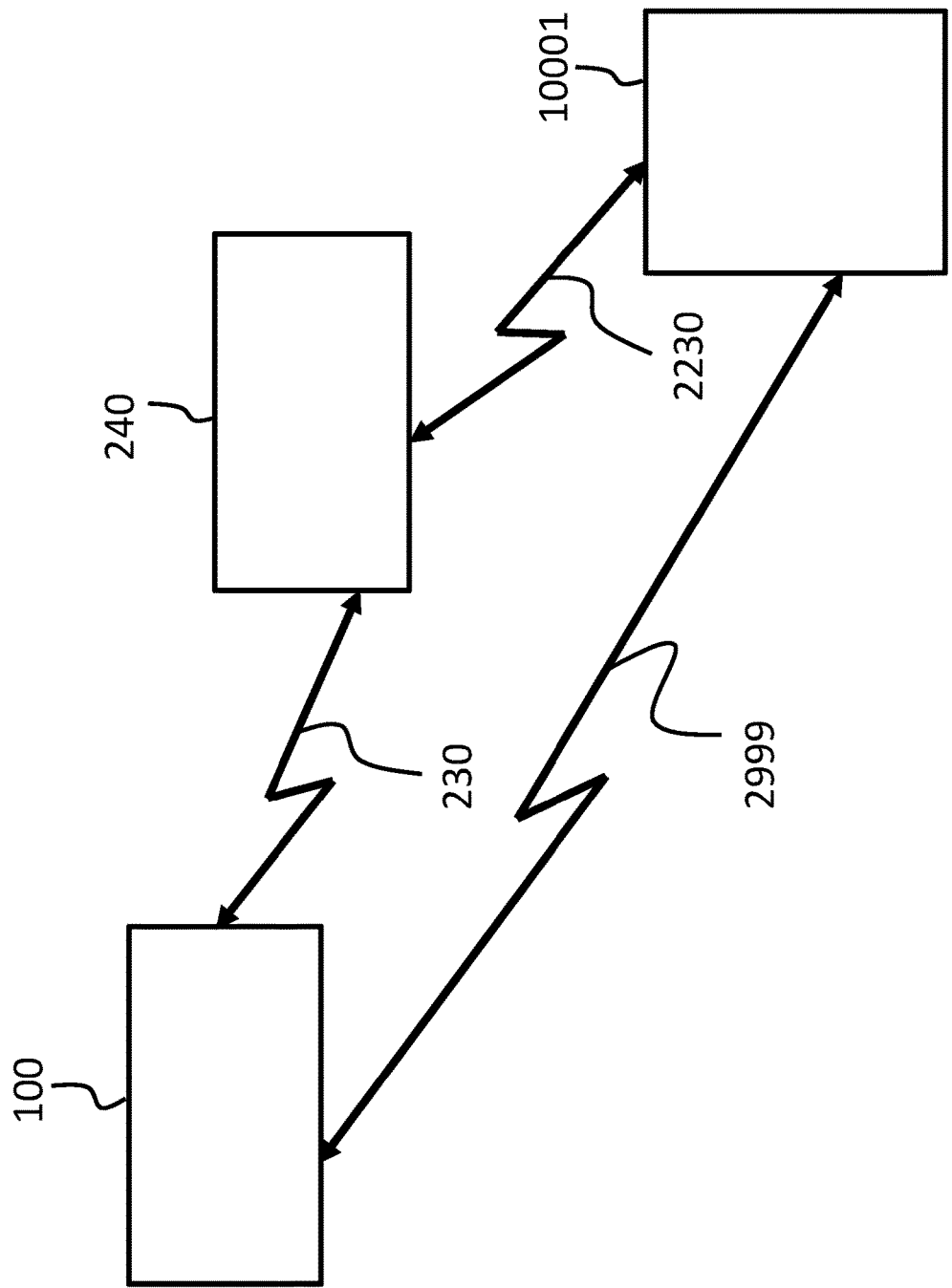
FIG. 10 presents another exemplary functional schematic of an exemplary system according to an exemplary embodiment.

In view of the above, FIG. 10 depicts an exemplary functional schematic, where the remote device 240 is in communication with a geographically remote device/facility 10001 via link 2230, which can be an internet link. The geographically remote device/facility 10001 can encompass controller 1212, and the remote device 240 can encompass the user interface 1214. Also, as can be seen, there can be a direct link 2999 with the prosthesis 100 and the remote facility 10001

Accordingly, an exemplary embodiment entails executing some or all of the method actions detailed herein where the recipient of the hearing prosthesis, the hearing prosthesis 100 and/or the portable handheld device 240 is located remotely (e.g., geographically distant) from where at least some of the method actions detailed herein are executed. These method actions that are executed remotely can be any of the word prediction/identification/sound prediction, etc., functions detailed above. (The smart phone or other extra device can execute/be configured to execute one or more of these methods/have these functions.)

It is noted that in describing various teachings herein, various actions and/or capabilities have been attributed to various elements of the system 210. In this regard, any disclosure herein associated with a given functionality or capability of the hearing prosthesis 100 also corresponds to a disclosure of a remote device 240 (e.g., a portable handheld device) having that given functionality or capability providing that the art enables such and/or a disclosure of a geographically remote facility 10001 having that given functionality or capability providing that the art enables such. Corollary to this is that any disclosure herein associated with a given functionality or capability of the remote device 240 also corresponds to a disclosure of a hearing prosthesis 100 having that given functionality or capability providing that the art enables such and/or disclosure of a geographically remote facility 10001 having that given functionality or capability, again providing that the art enables such. As noted above, the system 210 can include the hearing prosthesis 100, the remote device 240, and the geographically remote device 1000.

It is noted that any method detailed herein also corresponds to a disclosure of a device and/or system configured to execute one or more or all of the method actions associated there with detailed herein. In an exemplary embodiment, this device and/or system is configured to execute one or more or all of the method actions in an automated fashion. That said, in an alternate embodiment, the device and/or system is configured to execute one or more or all of the method actions after being prompted by a human being. It is further noted that any disclosure of a device and/or system detailed herein corresponds to a method of making and/or using that the device and/or system, including a method of using that device according to the functionality detailed herein.

It is noted that embodiments include non-transitory computer-readable media having recorded thereon, a computer program for executing one or more or any of the method actions detailed herein. Indeed, in an exemplary embodiment, there is a non-transitory computer-readable media having recorded thereon, a computer program for executing at least a portion of any method action detailed herein.

Any action disclosed herein that is executed by the prosthesis 100 can be executed by the device 240 and/or the remote system in an alternative embodiment, unless otherwise noted or unless the art does not enable such. Thus, any functionality of the prosthesis 100 can be present in the device 240 and/or the remote system an alternative embodiment. Thus, any disclosure of a functionality of the prosthesis 100 corresponds to structure of the device 240 and/or the remote system that is configured to execute that functionality or otherwise have a functionality or otherwise to execute that method action.

Any action disclosed herein that is executed by the device 240 can be executed by the prosthesis 100 and/or the remote system in an alternative embodiment, unless otherwise noted or unless the art does not enable such. Thus, any functionality of the device 240 can be present in the prosthesis 100 and/or the remote system an alternative embodiment. Thus, any disclosure of a functionality of the device 240 corresponds to structure of the prosthesis 100 and/or the remote system that is configured to execute that functionality or otherwise have a functionality or otherwise to execute that method action.

Any action disclosed herein that is executed by the remote system can be executed by the device 240 and/or the prosthesis 100 in an alternative embodiment, unless otherwise noted or unless the art does not enable such. Thus, any functionality of the remote system can be present in the device 240 and/or the prosthesis 100 as alternative embodiment. Thus, any disclosure of a functionality of the remote system corresponds to structure of the device 240 and/or the prosthesis 100 that is configured to execute that functionality or otherwise have a functionality or otherwise to execute that method action.

In an exemplary embodiment, the processing components detailed herein can include an expert sub-system that includes factual domain knowledge and experience that will enable the word prediction/sound prediction/word identifications detailed herein, and this processing components can include or be configured to provide, output in the form of any of the actions and/or activities detailed above based on input. In this regard, the system can be an artificial intelligence system. The system is provided with a sufficient amount of data for training and validation ("big data"), and an expert sub-system is incorporated into the overall system(s). The expert sub-system can incorporate the factual domain knowledge and/or experience. This can result in a lesser amount of data being needed by the system relative to that which would be the case without the experts to achieve comparable output, all other things being equal.

The expert sub-system portion of the system can be a system that can be trained so as to be updated as needed, where a determination that updating is utilitarian can be made by the human expert. The sub-system is thus a system configured to be trained by, for example, incorporating new rules, algorithms and amendments, optimizing heuristics and algorithms according to input data such to maximize performance. The expert sub-system is configured such that once the updates have been validated, the system's expert sub-system is updated. During operation for the user, the input data is processed and then passed to the rule and algorithms that form a part of the systems recommendation engine. An expert sub-system is used, in some embodiments, for the predictions and identifications detailed above.

In an exemplary embodiment, the trained and/or partially trained sub-system provides output in the form of identification/productions. As part of a training process, this information is presented to the professionals for review and feedback in some embodiments. The recommendations can then be altered according to feedback. Data is then collected about the user or about the sound experiences, to improve performance/continue training.

Thus, as seen from the above, in an exemplary embodiment, the processing suite is an expert sub-system of the system that includes a code of and/or from a machine learning algorithm to analyze the metrics, and wherein the machine learning algorithm is a trained system trained based on a statistically significant population.

An exemplary machine learning algorithm can be a DNN, according to an exemplary embodiment. In at least some exemplary embodiments, the input into the system can be processed by the DNN (or the code produced/from by the DNN).

A "neural network" can be used as a machine learning system. Any disclosure herein of the species "neural network" constitutes a disclosure of the genus of a "machine learning system." While embodiments herein focus on the species of a neural network, it is noted that other embodiments can utilize other species of machine learning systems accordingly, any disclosure herein of a neural network constitutes a disclosure of any other species of machine learning system that can enable the teachings detailed herein and variations thereof. To be clear, at least some embodiments according to the teachings detailed herein are embodiments that have the ability to learn without being explicitly programmed. Accordingly, with respect to some embodiments, any disclosure herein of a device, system constitutes a disclosure of a device and/or system that has the ability to learn without being explicitly programmed, and any disclosure of a method constitutes actions that results in learning without being explicitly programmed for such.

Embodiments thus include analyzing the obtained data/input into the system utilizing a code of and/or from a machine learning algorithm to develop data that can be utilized to implement the applicable teachings herein. Again, in an exemplary embodiment, the machine learning algorithm can be a DNN, and the code can correspond to a trained DNN and/or can be a code from the DNN (more on this below).

It is noted that any method action disclosed herein corresponds to a disclosure of a non-transitory computer readable medium that has program there on a code for executing such method action providing that the art enables such. Still further, any method action disclosed herein where the art enables such corresponds to a disclosure of a code from a machine learning algorithm and/or a code of a machine learning algorithm for execution of such. In this regard, the code can correspond to a trained neural network. That is, as will be detailed below, a neural network can be "fed" significant amounts (e.g., statistically significant amounts) of data corresponding to the input of a system and the output of the system (linked to the input), and trained, such that the system can be used with only input, to develop output (after the system is trained). This neural network used to accomplish this later task is a "trained neural network." That said, in an alternate embodiment, the trained neural network can be utilized to provide (or extract therefrom) an algorithm that can be utilized separately from the trainable neural network. In one embodiment, there is a path of training that constitutes a machine learning algorithm starting off untrained, and then the machine learning algorithm is trained and "graduates," or matures into a usable code—code of trained machine learning algorithm. With respect to another path, the code from a trained machine learning algorithm is the "offspring" of the trained machine learning algorithm (or some variant thereof, or predecessor thereof), which could be considered a mutant offspring or a clone thereof. That is, with respect to this second path, in at least some exemplary embodiments, the features of the machine learning algorithm that enabled the machine learning algorithm to learn may not be utilized in the practice some of the method actions, and thus are not present the ultimate system. Instead, only the resulting product of the learning is used.

In an exemplary embodiment, the code from and/or of the machine learning algorithm utilizes non-heuristic processing to develop the data utilizeable by the system. In this regard, the system that is utilized to execute one or more of the method actions detailed herein, takes in data and extracts fundamental signal(s) therefrom, and uses this to inform itself. By way of example only and not by way of limitation, the system utilizes algorithms beyond a first-order linear algorithm, and "looks" at more than a single extracted feature. Instead, the algorithm "looks" to a plurality of features. Moreover, the algorithm utilizes a higher order nonlinear statistical model, which self learns what feature(s) in the input is important to investigate. As noted above, in an exemplary embodiment, a DNN is utilized to achieve such. Indeed, in an exemplary embodiment, as a basis for implementing the teachings detailed herein, there is an underlying assumption that the features of voice and/or the other input into the system that enable the production of hearing loss to be made are too complex to otherwise specified, and the DNN is utilized in a manner without knowledge as to what exactly on which the algorithm is basing its prediction/at which the algorithm is looking to develop its prediction. Still further, in an exemplary embodiment, the output is a prediction of an audiogram.

In at least some exemplary embodiments, the DNN is the resulting code used to make the prediction. In the training phase there are many training operations algorithms which are used, which are removed once the DNN is trained.

Briefly, it is noted that in at least some embodiments, the neural networks or other machine learning algorithms utilized herein do not utilize correlation, or, in some embodiments, do not utilize simple correlation, but instead develop relationships. In this regard, the learning model is based on utilizing underlying relationships which may not be apparent or otherwise even identifiable in the greater scheme of things. In an exemplary embodiment, MatLAB, Buildo, etc., are utilized to develop the neural network. In at least some of the exemplary embodiments detailed herein, the resulting train system is one that is not focused on a specific voice feature, but instead is based on overall relationships present in the underlying significant samples (e.g., statistically significant samples) provided to the system during the learning process. The system itself works out the relationships, and there is no known correlation based on the features associated with the relationships worked out by the system.

The end result is a code which is agnostic to input features. That is, the code of the trained neural network and/or the code from the trained neural network is such that one cannot identify what input features are utilized by the code to develop the production (the output of the system). The resulting arrangement is a complex arrangement of an unknown number of features of voice that are utilized to predict the recommendations of the system. The code is written in the language of a neural network, and would be understood by one of ordinary skill in the art to be such, as differentiated from a code that utilized specific and known features. That is, in an exemplary embodiment, the code looks like a neural network.

Consistent with common neural networks, there are hidden layers, and the features of the hidden layer are utilized in the process to predict the hearing impediments of the subject.

Still, it noted that in at least some exemplary embodiments, one or more method actions detailed herein are executed without utilizing a neural network or otherwise some form of machine learning algorithm or code based thereon. Still, in at least some exemplary embodiments, some method actions are executed by utilizing a code written in the language of a neural network.

It is further noted that in at least some exemplary embodiments, the data that is utilized to train the machine learning systems detailed herein can be developed utilizing a significant population (e.g., statistically significant population) that has a hearing aid and/or a cochlear implant, etc.

Thus, in view of the above, it is to be understood that in at least some embodiments, the code of the machine learning algorithm is a trained neural network.

The artificial intelligence components and/or DNNs, etc., can be embedded on/in a chip, which can be used in/part of the systems herein.

A computer system may be implemented as a personal computer, laptop computer, workstation, handheld computer or special-purpose appliance specifically designed to implement some teachings herein. It is contemplated that some or all of the voice analysis functionality may be implemented in a wearable computer and/or integrated with voice capture device, or provided in a device such as a dictation machine, cell phone, voice recorder, MP3 recorder/player, iPod by Apple Computers Inc., or similar device.

In at least some exemplary embodiments, as noted above, there is a non-transitory computer readable medium corresponding to a software product. The logical operations of the components herein described may be implemented (1) as a sequence of microprocessor implemented acts or program modules running on a microprocessor and/or (2) as interconnected machine logic circuits or circuit modules within a computing device. The implementation is a matter of choice dependent on the performance requirements of the particular application. Accordingly, the logical operations described herein may be referred to variously as operations, routines, structural devices, acts, or modules. While the embodiments are sometimes discussed as being implemented as software, it will be recognized by one skilled in the art that these operations, structural devices, acts and modules may be implemented in software, in firmware, in special purpose digital logic, and any combination thereof.

Some embodiments include a distributed architecture for implementing features of some teachings herein. In the implementation, client processes involving capturing voice and presenting feedback to the user are provided by a client component while signal processing and analysis is provided by a network-coupled service. Resources used to implement certain features can be shared across a plurality of clients. Clients may be implemented with comparatively low cost, lightweight components as the computationally intensive processes are offloaded to the signal processing service. Network may comprise a local area network (LAN), wide area network (WAN), public network such as the Internet, or other network implementations.

It is further noted that any disclosure of a device and/or system detailed herein also corresponds to a disclosure of otherwise providing that device and/or system.

It is also noted that any disclosure herein of any process of manufacturing other providing a device corresponds to a device and/or system that results there from. Is also noted that any disclosure herein of any device and/or system corresponds to a disclosure of a method of producing or otherwise providing or otherwise making such.

Any embodiment or any feature disclosed herein can be combined with any one or more or other embodiments and/or other features disclosed herein, unless explicitly indicated and/or unless the art does not enable such. Any embodiment or any feature disclosed herein can be explicitly excluded from use with any one or more other embodiments and/or other features disclosed herein, unless explicitly indicated that such is combined and/or unless the art does not enable such exclusion.

While various embodiments of the present invention have been described above, it should be understood that they have been presented by way of example only, and not limitation. It will be apparent to persons skilled in the relevant art that various changes in form and detail can be made therein without departing from the spirit and scope of the invention.

What is claimed is:

1. A method, comprising:
receiving a signal which includes speech data;
processing the received signal to identify and/or predict one or more words in the speech data; and
evoking a hearing percept based in the received signal, wherein the evoked hearing percept includes one or more modified words based on the identification and/or prediction of the one or more words, wherein
the processing introduces a delay between receiving the signal and evoking the hearing percept.

2. The method of claim 1, wherein at least one of:
the signal is modified to produce a word that sounds differently relative to that which would have been the case in the absence of the modification; or
a new signal is produced that is provided to a device that evokes the hearing percept, which new signal results in the production of a word that sounds differently relative to that which would have been the case if the signal was used by the device.

3. The method of claim 2, wherein at least one of:
the signal is modified to produce a word with a different accent relative to that which would have been the case in the absence of the modification; or
a new signal is produced that is provided to a device that evokes the hearing percept, which new signal results in the production of a word with a different accent relative to that which would have been the case if the signal was used by the device.

4. The method of claim 1, wherein:
the evoked hearing percept includes a totally synthesized word based on the identification and/or prediction of the one or more words in place of a word that would have been presented based on the signal.

5. The method of claim 1, wherein:
the evoked hearing percept includes only speech, which speech is intentionally different from that which would have been the case in the absence of the identification and/or prediction.

6. The method of claim 1, wherein:
the processing of the received signal predicts one or more words in the speech data; and
the one or more modified words includes one or more predicted words from the prediction of one or more words.

7. A method, comprising:
receiving a signal which includes speech data;
processing the received signal to identify and/or predict one or more words in the speech data; and
evoking a hearing percept based in the received signal, wherein the evoked hearing percept includes one or more modified words based on the identification and/or prediction of the one or more words, wherein the processing is not correlated with a noticeable delay in a device used to execute the evoking of the hearing percept noticed by the person in which the hearing percept is evoked.

8. The method of claim 7, wherein the device used to execute the evoking of the hearing percept is a hearing prosthesis.

9. A method, comprising:
receiving a signal which includes speech data;
processing the received signal to identify and/or predict one or more words in the speech data; and
evoking a hearing percept based in the received signal, wherein the evoked hearing percept is a different hearing percept relative to that which would have been the case in the absence of the identification and/or prediction; and
at least one of:
the method includes automatically adjusting a noise control system of a hearing prosthesis that is evoking the hearing percept based on the identified and/or predicted one or more words;
the method includes automatically adjusting a volume and/or a gain of a hearing prosthesis that is evoking the hearing percept based on the identified and/or predicted one or more words;
the action of evoking the hearing percept is executed using a hearing prosthesis that is configured to evoke the hearing percept such that a hybrid word is provided to the recipient based on the results of the identification; or
the action of evoking the hearing percept is executed using a hearing prosthesis that is configured to evaluate a level of certainty of the identification and generate a hearing percept based on the evaluation of the level of certainty, wherein the generated hearing percept is different depending on the level of certainty.

10. The method of claim 9, further comprising:
automatically adjusting a noise control system of a hearing prosthesis that is evoking the hearing percept based on the identified and/or predicted one or more words.

11. The method of claim 9, further comprising:
automatically adjusting a volume and/or a gain of a hearing prosthesis that is evoking the hearing percept based on the identified and/or predicted one or more words.

12. The method of claim 9, wherein at least one of:
signal is modified to produce a word that is a different word than that which would have likely been perceived by the recipient relative to that which would have been the case in the absence of the modification; or
a new signal is produced that is provided to a device that evokes the hearing percept, which new signal results in the production of a word that is a different word than that which would have likely been perceived by the recipient relative to that which would have been the case if the signal was used by the device.

13. The method of claim 9:
wherein the action of evoking the hearing percept is executed using a hearing prosthesis that is configured to evoke a hearing percept such that a hybrid word is provided to the recipient based on the results of the identification.

14. The method of claim 9:
wherein the action of evoking the hearing percept is executed using a hearing prosthesis that is configured to evaluate a level of certainty of the identification and generate a hearing percept based on the evaluation of the level of certainty, wherein the generated hearing percept is different depending on the level of certainty.

15. The method of claim 9, further comprising:
the evoked hearing percept is a totally synthesized hearing percept that maximizes comprehension of speech at the expense of tone, uniqueness and/or emphasis.

16. The method of claim 9, wherein at least one of:
signal is modified to produce a meaning that is a different than that which would have likely been comprehended by the recipient relative to that which would have been the case in the absence of the modification; or
a new signal is produced that is provided to a device that evokes the hearing percept, which new signal produces a meaning that is a different from that which would have likely been comprehended by the recipient relative to that which would have been the case if the signal was used by the device.

17. A system, comprising:
a device including a sound capture device and a processing system, wherein the device is configured to convert sound captured by the system and process a signal based on the captured sound with the processing system and evoke a hearing percept based on output from the processing system based on the signal, wherein
the system includes a sound prediction and/or word identification functionality such that the system is configured to predict sound that is captured by the sound capture device.

18. The system of claim 17, wherein:
wherein the system has the sound prediction functionality which is a word prediction functionality.

19. The system of claim 18, wherein:
wherein the system is configured to evoke a hearing percept based on a result of the word prediction functionality that is different from that which would be the case in the absence of the result.

20. The system of claim 17, wherein:
the sound prediction functionality is a word prediction functionality, and the system has such, and wherein the word prediction functionality is the ability to predict a word after one or more next words that have yet to be received by the processing system.

21. The system of claim 17, wherein:
the device is configured to increase an aggressiveness of a noise reduction algorithm based on prediction of sound.

22. The system of claim 17, wherein:
the system includes a speech presence probability estimator; and
the system is configured to use the sound prediction functionality to enhance functionality of the speech presence probability estimator.

23. The system of claim 17, wherein:
the system is configured to introduce a variable delay between sound capture and the evocation of the hearing percept; and
the system is configured to use the prediction functionality to predict words and then compare the predicted word to what is then received and then adjust the operation of the system to evoke a hearing percept based on this comparison.

24. The system of claim 17, wherein:
the system is configured to introduce a delay between the temporal locations of the sound capture and the evocation of the hearing percept that is delta to the normal processing delay; and
the system is configured to identify a sound environment, and vary the delay based on the identified sound environment.

25. The system of claim 17, wherein:
wherein the device is a hearing prosthesis.

26. The system of claim 17, wherein:
wherein the device is a hearing device.

* * * * *